United States Patent
Mooney et al.

(10) Patent No.: US 7,020,687 B2
(45) Date of Patent: Mar. 28, 2006

(54) PROVIDING ACCESS TO A PLURALITY OF E-MAIL AND VOICE MESSAGE ACCOUNTS FROM A SINGLE WEB-BASED INTERFACE

(75) Inventors: Eoin Mooney, Galway (IE); Noel Duggan, Galway (IE); Lorcan O'Toole, Galway (IE); Michael Hartman, Galway (IE)

(73) Assignee: Nortel Networks Limited, St. Laurent (CA)

( * ) Notice: Subject to any disclaimer, the term of this patent is extended or adjusted under 35 U.S.C. 154(b) by 462 days.

(21) Appl. No.: 09/860,419

(22) Filed: May 18, 2001

(65) Prior Publication Data

US 2002/0174194 A1 Nov. 21, 2002

(51) Int. Cl.
*G06F 13/00* (2006.01)

(52) U.S. Cl. .................................................... 709/206

(58) Field of Classification Search ................ 345/733, 345/734, 735, 736, 751, 752; 709/200, 202, 709/203, 204, 206, 207, 227
See application file for complete search history.

(56) References Cited

U.S. PATENT DOCUMENTS 6,725,268 B1 * 4/2004 Jackel et al. ................ 709/227

* cited by examiner

*Primary Examiner*—Robert B. Harrell
(74) *Attorney, Agent, or Firm*—Barnes & Thornburg LLP

(57) ABSTRACT

Consider a user who has three different types of email account. Previously, in order to access those different email accounts the user has had a terminal with three desktop applications, one for accessing each type of email account. The user has been unable to access all of his or her email accounts simultaneously. Instead, the user has had to connect, for example, using a RAS connection, to one of the email accounts and then terminate that RAS connection before initiating a new RAS connection to the next type of email account. This is time consuming and problematic for users, particularly those who travel frequently. Another problem is that the user must maintain software applications on his or her terminal, one for each of the different types of message account. This takes up valuable memory and processing capacity on the user terminal. The present invention removes these problems by providing a single web based interface that gives the user access to a plurality of different message accounts on different message servers. In addition, logon times and network bandwidth requirements are reduced by storing retrieved message information in a cookie on the user's terminal.

23 Claims, 13 Drawing Sheets

PROVIDING ACCESS TO A PLURALITY OF E-MAIL AND VOICE MESSAGE ACCOUNTS FROM A SINGLE WEB-BASED INTERFACE

FIELD OF THE INVENTION

The present invention relates to a method and apparatus for providing access to a plurality of message accounts from a single web-based interface.

BACKGROUND TO THE INVENTION

There is an increasing demand for access to message accounts such as email accounts from remote locations, for example, when a person needs to work from a location outside their usual office. Such, "roadwarriors" who travel frequently and need to work at different sites, need access to their email, voice mail and other messaging facilities from those different sites. Until now, this has typically been achieved by connecting a laptop computer, personal digital assistant or the like, to a public switched telephone network (PSTN) and making a connection using a modem to a data network such as a company intranet or the internet.

These connections from a PSTN to a data network using a modem are typically made using remote access service (RAS). RAS enables users of time division multiplex (TDM) communications networks such as public switch telephone networks (PSTN) to connect via a modem to an internet protocol communications network such as a corporate intranet or internet service provider. A RAS gateway acts as a translator between communications from the TDM network and the associated internet protocol communications network. For example, an end user may use a remote access service in order to access the internet from his or her home computer using a modem. The modem is used to make a dial up connection over the public telephone network to a RAS gateway and from there to the internet. Data is then sent over this path which includes the "voice" network or public telephone network.

A particular problem arises for users who have several different types of messaging accounts, especially "roadwarriors" who travel frequently and need to access their messaging accounts from remote locations. For example, a particular user may have a Microsoft Exchange (trade mark) email account, a Lotus Notes (trade mark) email account and a Novell Groupwise (trade mark) email account. In order to access those different email accounts the user has a laptop computer, personal computer or other suitable terminal which has three desktop applications, one for accessing each type of email account. However, it is not possible for the user to access all of his or her email accounts simultaneously. Instead, the user must connect, for example, using a RAS connection, to one of the email accounts and then terminate that RAS connection before initiating a new RAS connection to the next type of email account. This is time consuming and problematic for users, particularly those who travel frequently. For users within an office who are able to connect directly to the office's intranet, it is still necessary to connect to each email account in turn and this is still time consuming and frustrating for the user, even though it is not necessary to make RAS connections. Another problem is that the user must maintain software applications on his or her terminal, one for each of the different types of message account. This takes up valuable memory and processing capacity on the user terminal.

Another problem is that when a user accesses a particular message account, access to the account is often slow and significant amounts of bandwidth are taken up in transferring data from the account to the user's PC or other terminal.

An object of the present invention is to provide a method and apparatus for providing access to a plurality of message accounts from a single web-based interface which overcomes or at least mitigates one or more of the problems noted above.

Further benefits and advantages of the invention will become apparent from a consideration of the following detailed description given with reference to the accompanying drawings, which specify and show preferred embodiments of the invention.

SUMMARY OF THE INVENTION

According to an aspect of the present invention there is provided a method of providing access to a plurality of message accounts from a single web-based interface. Each message account has an associated messaging server and is arranged to be accessed from that associated messaging server using application software, said application software being different for each message account and associated messaging server. The messaging servers are connected to a communications network, and the method comprises the steps of:

at a web server connected to the communications network, receiving user inputs from a web browser via the single web interface which indicate the user's desire to access messages from one or more of the message accounts;

using the web server to access information from the messaging servers associated with the message accounts on the basis of the user inputs and using information about the messaging servers; and providing the accessed information for display on a user terminal via the single web interface such that the application software is not required on the user terminal.

For example, the message accounts can comprise a Microsoft Exchange email account provided on a Microsoft Exchange messaging server, a Lotus Notes email account provided on a Domino server and a Groupwise email account provided on a Groupwise server. These email accounts are arranged to be accessed using client application software specific to each type of email account and previously users have needed to install that application software on a user terminal. However, the present invention avoids this requirement by using a web server that provides a single web interface via which all the email accounts are accessible.

The web server receives user inputs from a web browser on the user's terminal. These user inputs indicate for example that the user wishes to access email messages from one of the email accounts. The web server has access to pre-specified information about the messaging servers and about user names and passwords for the various email accounts. Also, the web server is able to communicate with all the different types of messaging server, for example, to retrieve email messages. Information from the messaging servers can then be displayed by the web server, using the single web interface. Thus by using a single web-interface the user is able to access all his or her message accounts and does not need to store application software for each account type on his or her terminal.

The user only needs to learn how to use the single web-interface and does not need to continually adjust to different interfaces provided by the different message accounts.

Preferably, the web server has access to user names and passwords for each of the message accounts. This provides the advantage that the user does not need to type in his or her user name and password each time one of the message accounts is accessed.

Preferably, the method further comprises providing at least part of said accessed information to the user terminal for storage in one or more cookies on the user terminal. For example, the sender name, subject and date for each retrieved message may be stored in a cookie on the user's terminal. On future logons, information from the cookie is used to populate a message list view. This helps to speed up presentation of the message list view and reduces network bandwidth requirements.

According to another aspect of the invention there is provided a method of accessing a plurality of email accounts from a single web-based interface, each email account having an associated messaging server and being arranged to be accessed from that associated messaging server using application software, said application software being different for each message account and associated messaging server, the messaging servers being connected to a communications network, said method comprising the steps of:
  using a web browser to access the single web interface that is provided by a web server connected to the communications network;
  making a user input via the web interface, said user input indicating the user's desire to access messages from one or more of the message accounts;
  receiving information about the messages at a user terminal via the single web interface, without the need for the application software to be provided on that user terminal.

This method can advantageously be carried out by an end user who needs to access more than one message account quickly and easily. Because a single web based interface is provided the user is able to access this web based interface to view all his or her message accounts, and is not required to log into those accounts separately. This is particularly advantageous for end users who travel frequently as mentioned above.

According to another aspect of the present invention there is provided a web server arranged to provide access to a plurality of message accounts from a single web-based interface, each message account having an associated messaging server and being arranged to be accessed from that associated messaging server using application software, said application software being different for each message account and associated messaging server, the messaging servers and web-server being connected to a communications network, said web-server comprising:
  one or more web pages arranged to receive user inputs from a web browser which indicate the user's desire to access messages from one or more of the message accounts; and
  a processor arranged to access information from the messaging servers associated with the message accounts on the basis of the user inputs and using information about the messaging servers; and wherein the web pages are arranged to display the accessed information on a user terminal via the single web interface such that the application software is not required on the user terminal.

According to another aspect of the present invention there is provided a web site arranged to provide a single web-based interface via which a plurality of message accounts are accessible. Each message account having an associated messaging server and being arranged to be accessed from that associated messaging server using application software, said application software being different for each message account and associated messaging server, the messaging servers and web-server being connected to a communications network, said web-site comprising:
  a plurality of web pages arranged to receive user inputs from a web browser which indicate the user's desire to access messages from one or more of the message accounts; and
  a computer program arranged to access information from the messaging servers associated with the message accounts on the basis of the user inputs and using information about the messaging servers; wherein the web pages are arranged to display the accessed information on a user terminal via the single web interface such that the application software is not required on the user terminal.

According to another aspect of the present invention there is provided a computer program arranged to control a web server such that access is provided to a plurality of message accounts from a single web-based interface, each message account having an associated messaging server and being arranged to be accessed from that associated messaging server using application software, said application software being different for each message account and associated messaging server, the messaging servers and web-server being connected to a communications network, said computer program being arranged to control the web-server such that:
  one or more web pages are provided, arranged to receive user inputs from a web browser which indicate the user's desire to access messages from one or more of the message accounts;
  information is accessed from the messaging servers associated with the message accounts on the basis of the user inputs and using information about the messaging servers; and
  the web pages are arranged to display the accessed information on a user terminal via the single web interface such that the application software is not required on the user terminal.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

Embodiments of the present invention are described below by way of example only. These examples represent the best ways of putting the invention into practice that are currently known to the Applicants although they are not the only ways in which this could be achieved.

The term "message account" is used to refer to a store at which messages sent to a particular user are received and stored and from which messages created by the user may be sent. Examples of message accounts comprise email accounts, voice mail accounts, combined email and voice mail accounts and accounts for any other suitable type of message including video messages. Associated with a particular message account is an address such as an email address or telephone number.

An active server page (ASP)-based application is a collection of ASP pages and ActiveX (COM, component object model) components.

An ASP Session object is used to store information for a particular user.

Figure 1:
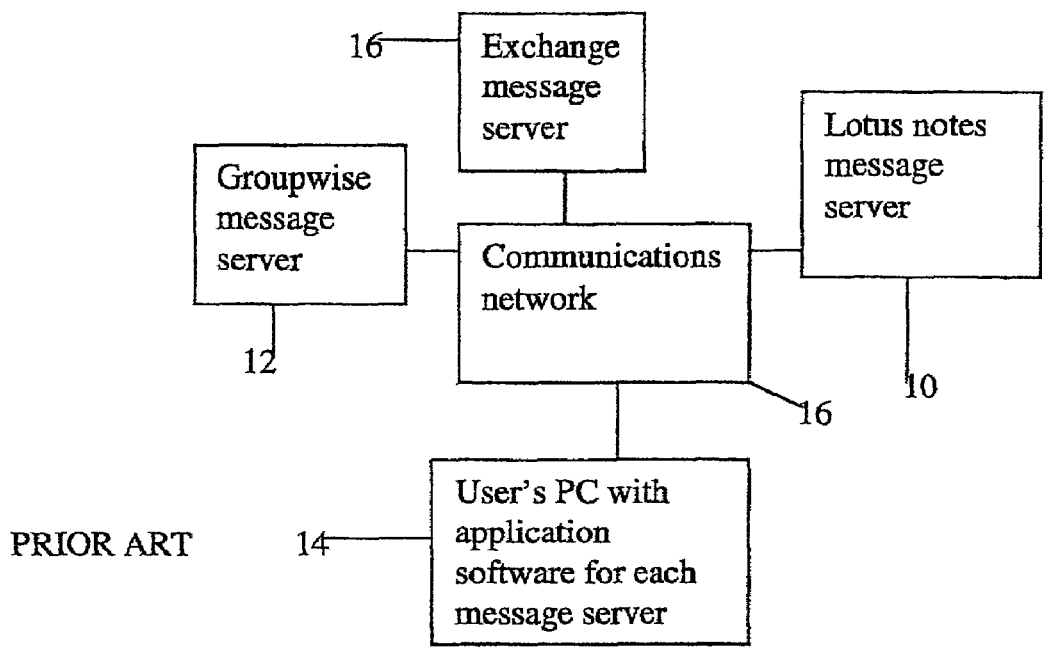
FIG. 1 is a schematic diagram of a communications network according to the prior art.

FIG. 1 shows a communications network 16 according to the prior art. The communications network 16 itself may comprise a corporate intranet such as a wide area network or local area network or any other suitable type of communications network such as the internet connected to one or more public switched telephone networks.

Connected to the communications network is a plurality of message servers of different types. For example, a Groupwise message server 12, a Microsoft Exchange message server 16 and a Lotus notes message server 10. Each message server comprises a plurality of message accounts such as email accounts. A user has a personal computer 14 or other suitable terminal connected to the communications network 16. For example, this connection may be via a RAS gateway from a public switched telephone network. The user's personal computer 14 or other terminal comprises application software for accessing message accounts on the message servers 10, 12, 16. For example, in the situation illustrated in FIG. 1, suppose that the user has a Groupwise email account, a Microsoft Exchange email account and a Lotus Notes email account. In order to use those email accounts the user must have Groupwise application software, Microsoft Exchange application software and Lotus Notes application software on his or her PC. To access emails from the Groupwise email account, the user establishes a connection to the Groupwise message server 12, for example, using a RAS connection and then uses the Groupwise application software on his or her PC 14 to access emails from his or her Groupwise account. The user enters his or her user name and password that are specific to the Groupwise account in order to access the emails. If the user then requires access to his or her Lotus Notes email account, the user must first disconnect from the Groupwise message server 12 and establish a connection to the Lotus notes message server 10. As before, the user then operates the Lotus Notes application software on his or her PC 14 in order to access the Lotus Notes email account. This is time consuming and frustrating for the user and in addition, the user must store copies of all the required application software on his or her PC 14.

Figure 2:
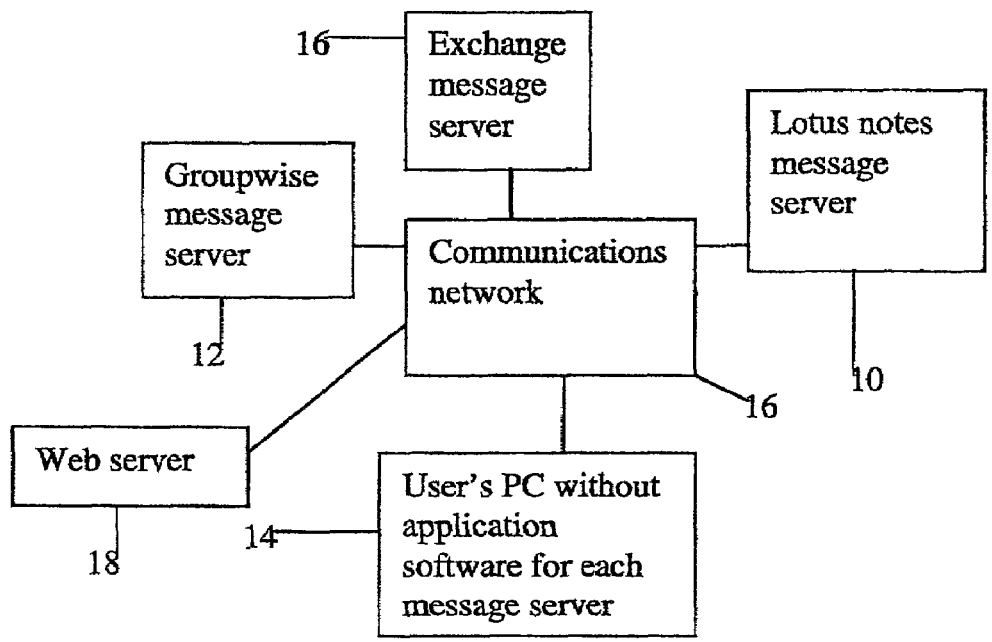
FIG. 2 is a schematic diagram of a communications network comprising an apparatus for providing access to a plurality of message accounts from a single web-based interface.

FIG. 2 shows the communications network of FIG. 1 which has been modified to comprise an apparatus for providing access to a plurality of message accounts from a single web-based interface. In this case, the user's PC or other terminal 14 does not require application software for each of the message servers 10, 12, 16. Instead a web server 18 is provided which removes the need for the application software on the user's PC 14. The web server 18 is connected to the communications network and provides a single web interface via which the user is able to access his or her email accounts on all of the message servers 10, 12, 16. The single web interface comprises web pages provided by the web server, such as active server pages (ASPs) or any other suitable type of web pages. The user's PC comprises a web browser and using this the user is able to access the web interface provided by the web server. The web server 18 is arranged to communicate with the message servers 12 using a suitable protocol such as internet message access protocol (IMAP). In this way the web server is able to access messages from all of the user's email accounts and provide these to the user via the web based interface.

In a preferred example, each of the message servers 10, 12, 16 is able to communicate using IMAP. As described below IMAP is an open protocol and within the specifications of this protocol different variations are possible. Thus a Groupwise message server which uses IMAP typically uses that IMAP protocol in a slightly different manner from a Lotus Notes IMAP message server or a Microsoft Exchange IMAP server. In order to cope with this, the web server 18 needs to be able to communicate using all these different variations of IMAP.

Internet Message Access Protocol (IMAP) provides a method of accessing electronic mail or bulletin board messages that are kept on a (possibly shared) mail server. Using IMAP, a client email program is able to access remote message accounts as if they were local. For example, a user with a laptop computer who is travelling is able to access and work with emails stored on an IMAP server. IMAP enables this to be achieved whilst minimising the requirement of transferring messages back and forth between the laptop computer and the IMAP server. For example, IMAP provides support for "online", "offline" and "disconnected" modes of access. In addition, IMAP servers allow simultaneous interactive access to user mailboxes by multiple clients. However, IMAP is used for message access only;

that is through IMAP the user can create, delete or rename mail boxes; get new messages; delete messages; and perform search functions on mail. A separate protocol is required for sending mail (for example, simple mail transfer protocol SMTP, IETF RFC 821). IMAP is an open protocol based on the standard described in Internet Engineering Task Force request for comments (IETF RFC) 2060.

Essentially, an IMAP client is a piece of software that implements IMAP to facilitate communication with an IMAP server. Usually the IMAP client acts directly on the behalf of a user who issues high-level commands, like "login", by keying in data, whereas the IMAP client issues low level commands to the server.

In contrast with the stateless Hypertext Transfer Protocol (HTTP), IMAP is a stateful protocol and thus only allows access to information once log-in has been successfully negotiated and the client is in the correct state. HTTP, conversely, always allows access to information since HTTP works to access an addressed server, retrieve a requisite page and then display the page locally. In other words, HTTP communication is seamless since the web-server is un-reactive to the HTTP message content, whereas IMAP is session-orientated.

In the field of software design and communication protocols, it will be understood that a "stateful" protocol requires an application to communicate a series of structured or ordered commands to a server and wherein there exists a precedence relationship between individual commands. In order for there to be successful communication, a client must know which commands have been issued as well as the set of valid commands that can be sent in reply. In other words, in a state of protocol, there is a history of the commands sent and an understanding of the responses (i.e. commands) that can be validly sent in reply; this is indicative of the "state" of the session/protocol. By way of example, a stateful protocol is inherently supported by an e-mail system because a login command must be actioned before a read command can be issued to retrieve an e-mail message. A typical machine-readable code, point-to-point stateful communication protocol pertaining to log-in and authentication between the IMAP client (denoted "C") and IMAP server (denoted "S") may take the form:

C: A001 AUTHENTICATE KERBEROS_V4
S: +AmFYig==
C: BAcAQU5EUkVXLkNNVS5FRFUAOCAsho84k
   LN3/ljmrMG+25a4DT+nZlmJjnTNHJUtxAA+
   oOKPKfHEcAFs9a3CL5Oebe/yd
   HJUwYFdWwuQ1Mwiy6lesKvjL5RI9WjXUb9MwT
   9bpObYLGOK i1Qh
S: +or/EoAADZkl=
C: DiAF5A4gA+oOIALuBkAAmw==
S: A001 OK Kerberos V4 authentication successful
C: a001 LOGIN SMITH SESAME
S: a001 OK LOGIN completed
C: A142 SELECT INBOX As can be appreciated from the exemplary machine-readable code provided above, there is clearly a distinct sequence of requests and responses between the IMAP client and the IMAP server.

To complete the picture of "stateful" as opposed to "stateless" communication protocols, the skilled addressee will appreciate that, in a stateless protocol, there is no record/interest in previous commands issued by or within the system. Putting this differently, stateless communication protocol is inappropriate for a system that is sequence-orientated in the recovery of data. As an example, a web-browser operates in a stateless fashion when recovering web-pages since web-browser operation is entirely independent of the order in which web-pages are recovered.

Figure 3:
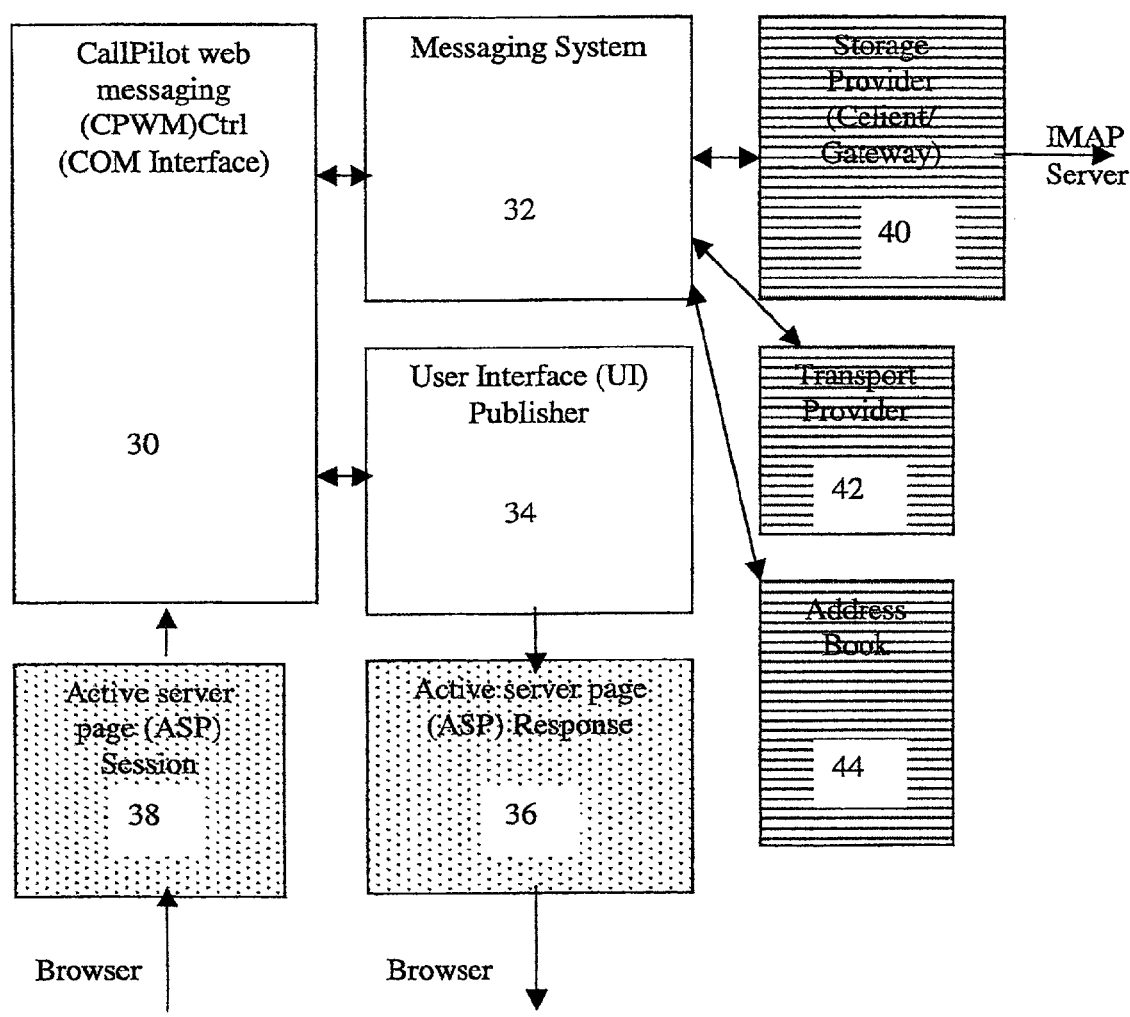
FIG. 3 is a schematic diagram of functional components of the web server of FIG. 2.

FIG. 3 is a schematic diagram of functional components of the web server. The web server comprises a component object model (COM) interface 30, a messaging system 32 a Cclient module 40 and a user interface publisher 34. In the example shown in FIG. 3 the COM interface is a COM interface designed for a CallPilot (trade mark) web messaging system as provided by Nortel Networks. However, this is not essential, any suitable type of COM interface may be used. The web server may also comprise a transport provider 42 and address book 44 although these components are not essential. The COM interface 30 is arranged to handle all request from the user via the ASP session 38. ASP pages initiated by a user during an ASP session 38 have handles to COM controls within the COM interface 30. These COM controls have links into main source code in a messaging system 32 as described below and call an appropriate application programming interface (API). In this way, data is passed to an API as a result of user requests and data received from a message server is passed in the other direction once it has been received.

The Messaging system 32 holds all main code which processes and directs requests from the COM interface 30. The messaging system 32 is connected to the Cclient module 40 whose function is to process calls to message servers, such as IMAP message servers as indicated in FIG. 3. The user interface publisher 34 is able to create web pages, for example, hyper text mark-up language (HTML) pages and Java Script pages.

The Cclient module 40 is a set of APIs that can be used to access a plurality of different types of email server. For example, the Cclient module 40 is preferably arranged to comprise APIs for accessing any email server that runs an IMAP server. In this preferred embodiment the Cclient module 40 is used to connect, login, retrieve, save and send messages to any IMAP server that the user has access to. The Cclient module is written in the C programming language, although this is not essential, any suitable programming language can be used.

When a user first begins to access messages using the web server, he or she begins a session and an object is generated for that session which holds a subset of Cclient commands. The Cclient commands are wrapped in C++ code (or any other suitable object oriented programming language) because the Cclient module 40 is written in C. This makes it easier to implement the Cclient module 40 and to integrate the Cclient module 40 with the other components such as the messaging system 32 which are preferably formed using an object oriented programming language. Further details about the requests and responses that the Cclient module 40 processes are given in the IETF's RFC 2060.

As mentioned above the web server may also comprise a transport provider 42 and an address book 44. The transport provider 42 is a means of sending messages to one of the message servers. For example, the transport provider 42 preferably comprises a small mail transport protocol (SMTP) server. Most message servers comprise an SMTP server as is known in the art.

The Address Book 44 provides a means to browse for a name or address of an account on a message server. In a preferred example, the address book 44 comprises a Lightweight Directory Access Protocol (LDAP) server. Most message servers comprise an LDAP server as is known in the art and as described with reference to FIG. 4 below.

A method of accessing a message account using the system of FIGS. 2 and 3 is now described. The user activates his or her web browser on his or her PC 14 and uses this to access the web server 18. The user knows a universal resource locator (URL) for the single web interface provided by the web server 18 and is able to use the URL to view web pages provided by the web server 18. These web pages may be active server pages and a communication session is thus begun between the user's PC 14 and the web server 18. This is indicated in FIG. 3 by box 38 labelled ASP session. The user may be required to enter a user name and password at this stage as described in more detail below in the section headed "security".

The user is able to make inputs using the web interface in order to access and manipulate messages in his or her message accounts. These user inputs are communicated to the COM interface 30. User inputs which are requests such as Login, or Display Messages, require information from a particular message server. These requests are routed from the COM interface 30 to the messaging system 32 and so to the Cclient module 40. The Cclient module then processes calls to the appropriate message server. Data is then returned to the Cclient module 40 from the message server, for example, using IMAP, and this information is arranged and structured for passing back to the COM interface 30 via the messaging system 32. The COM interface processes the data such that it is suitable for publishing on the web interface and passes the processed data to the user interface publisher 34. The user interface publisher 34 then creates web pages containing the data, for example, a list of messages in the user's in-box, and writes the web page(s) to the user's browser using an ASP response object (see box 36 in FIG. 3).

Figure 4:
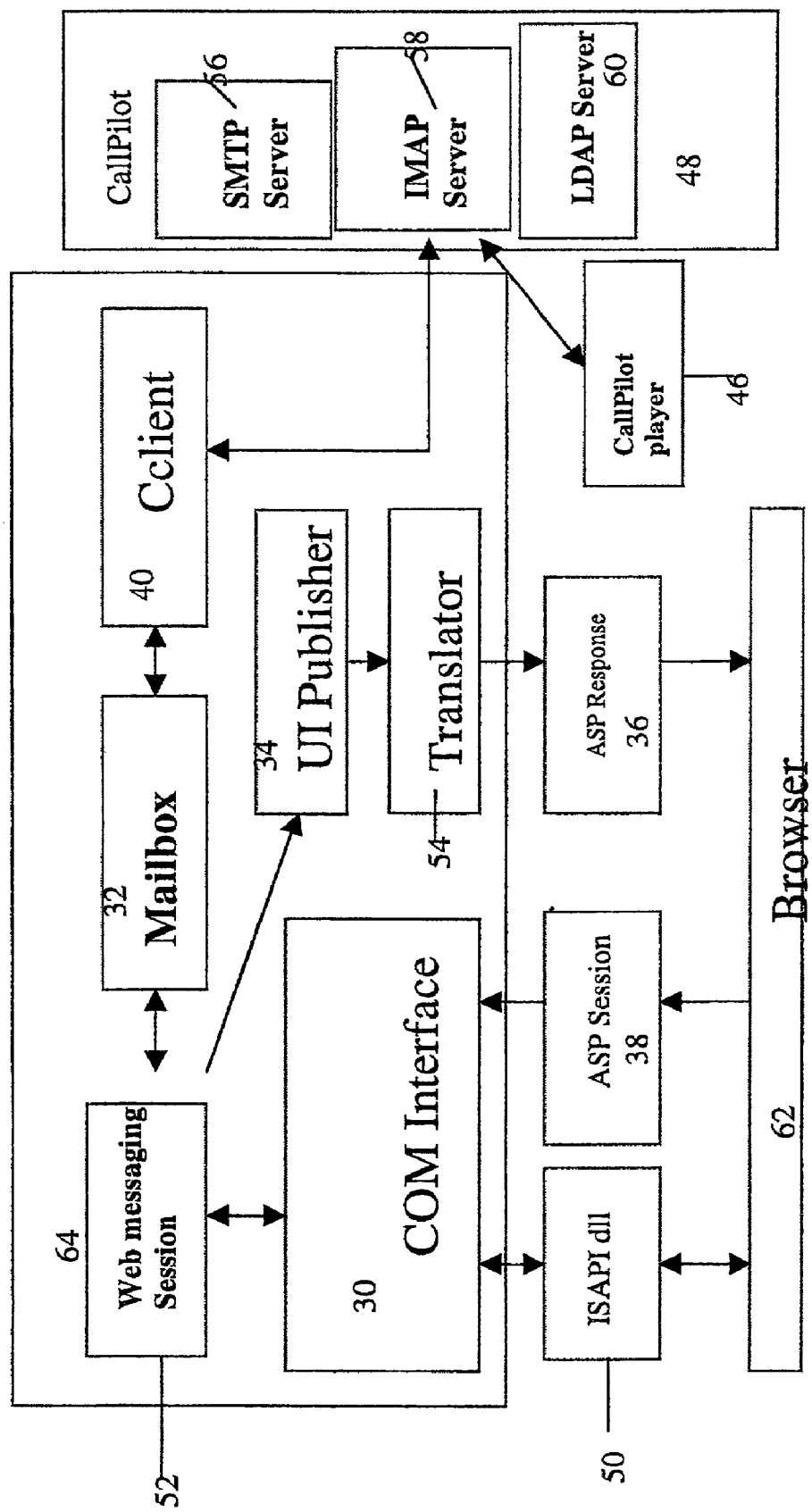
FIG. 4 is a schematic diagram of an object model for software on a web server.

FIG. 4 shows another example of a web server and indicates how the web server communicates with a web browser and with a CallPilot (trade mark) message server. FIG. 4 is similar to FIG. 3 and corresponding components are labelled using the same reference numerals.

In the example shown in FIG. 4 the web server comprises a translator 54 which operates to translate the web pages created by the user interface publisher 34 into different languages such as French or German, for presentation to the user.

The Cclient 40 communicates with one or more message servers, in this case, the message server is a CallPilot (trade mark) server 48 as commercially available from Nortel Networks. The CallPilot server comprises an IMAP server 58 which communicates with the Cclient in this example. However the CallPilot server 48 may also comprise a simple mail transfer protocol server (SMTP server 56) as well as a lightweight directory access protocol (LDAP) server 60. In this example, the IMAP server 58 also communicates with a CallPilot player 46 or other suitable device for playing voice mail messages to a user over the public switched telephone network or other suitable communications network.

In the example shown in FIG. 4, the items in box 64 are software components which form an object model. The COM interface object 30 communicates with a web messaging session object 52 which in turn communicates with a mailbox object 32.

Figure 5:
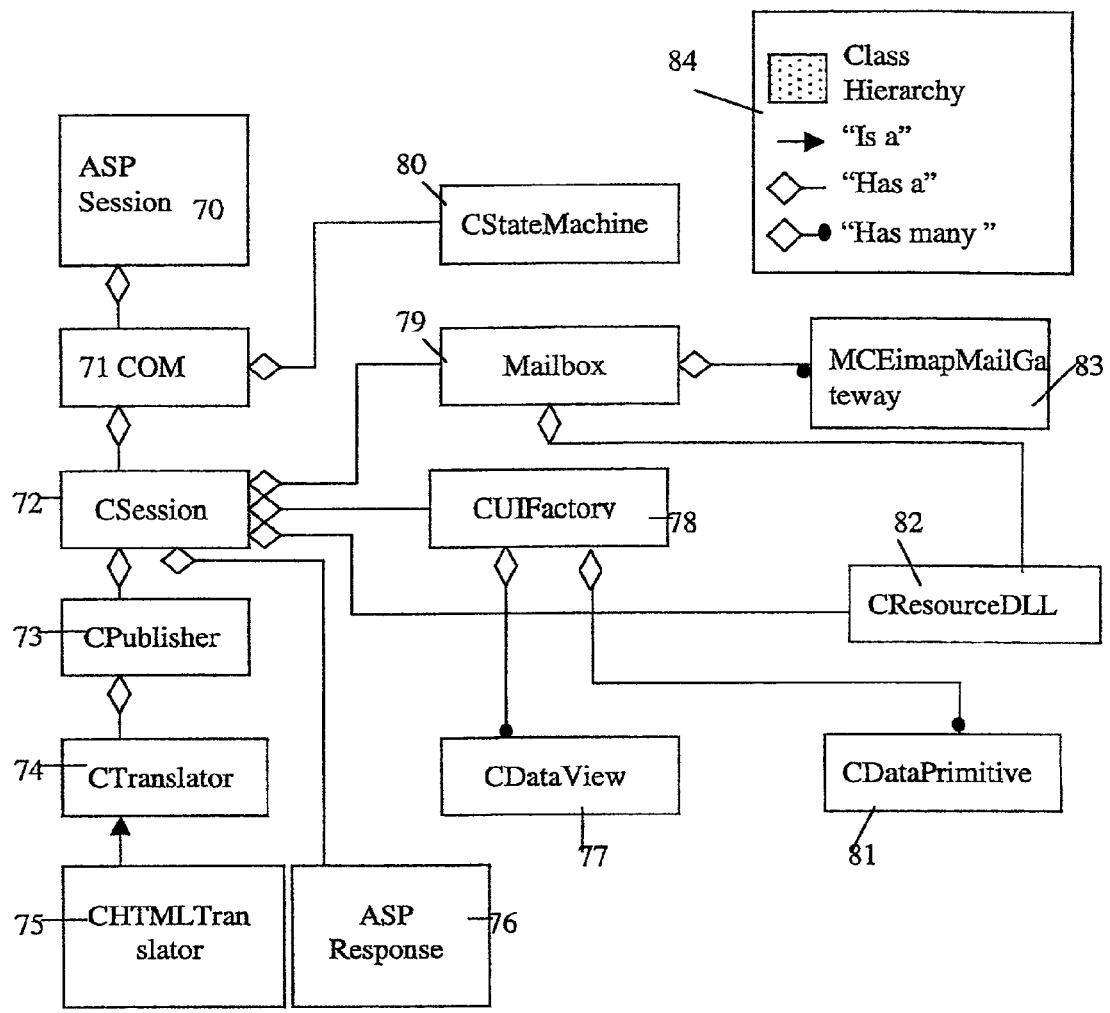
FIG. 5 is a high level hierarchy diagram.

FIG. 5 is a high-level class hierarchy diagram showing the relationships between objects in one possible design of the software on the web server. An ASP session object 70 processes calls to ASP pages. Through these, calls are made to the COM interface object 71 depending upon which state the system is in as described below.

Requests made to the COM interface object 71 are processed depending upon the current state of the system. In a preferred embodiment there are four states (Cloaded, CInitialising, CInitialized, CLogged In) each of which is a Class which inherits from a base CState Class.

When the COM object 71 is first created the system is placed in the CLoaded state. When an initial FRAMESET is processed in order to display a Login page, Navigation page and Header page the system is placed into a Cinitializing state.

The FRAMESET creates three HTML pages. These pages are created and displayed separately. Only when the last page is displayed does the state change from CInitialising to CInitialised. Once the user logs in the state is changed from CInitialised to CLogged In.

As explained above, in a particular state only certain calls can be processed. For example, if the system is currently in the CInitialised state then Login will be processed but Delete Message will not. Similarly in the CLogged In state calls like Login, Delete, Play and Refresh are all processed while calls like Login are not processed. If a call is not supported in a particular state then the default action is to perform a Logout. This results in the Login page being redisplayed and the state changing from its current value to CInitialised once the Login screen is fully displayed.

After processing by the COM interface object, the call is processed by the Csession object 72. The Csession object in turn activates the mailbox object 79 and the MCEimapMailGateway 83 object to process calls to an IMAP server. For example, to get messages from the IMAP server or to delete messages from the IMAP server.

The Csession object 72 receives data from the IMAP server and creates DataViews 77 which store the data to be displayed as HTML pages. This data may come from calls to the IMAP server or from strings in a CresourceDLL (dynamic link library) 82. The data is then passed to a Cpublisher 73 which in turn passes the data to an appropriate translator. For example an HTML translator 75 or an XML (extensible mark-up language) translator. Once the HTML page is written it is sent to the user's PC or client through an ASP response object 76.

Figure 6:
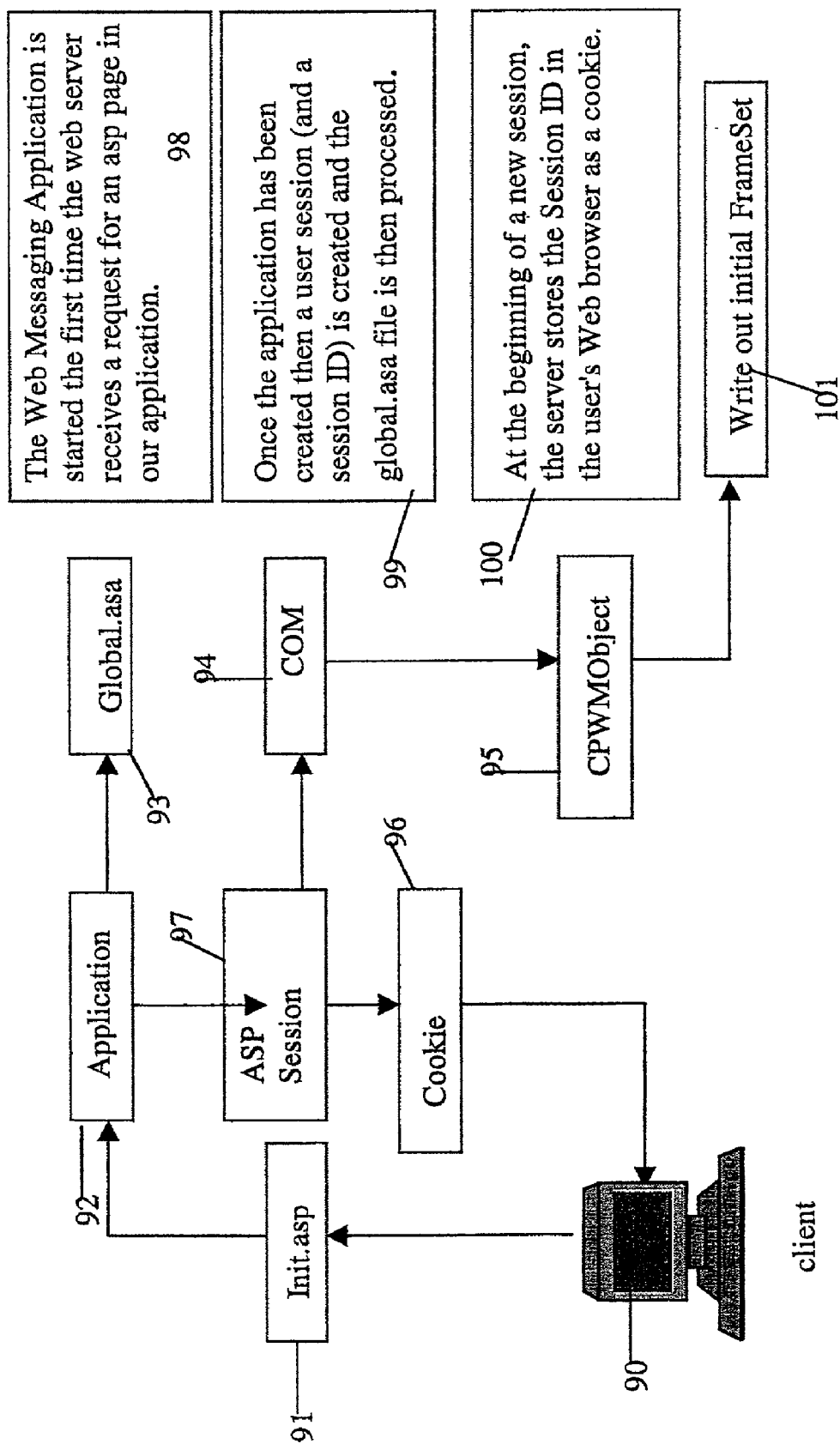
FIG. 6 is a flow diagram of a method of accessing messages from a message server.

FIG. 6 is a flow diagram indicating the events that occur when a user connects to the single web based user interface provided by the web server. A user operates a client machine 90 which has web browser software in order to access a known URL. This sends a request (see init.asp 91 in FIG. 6) to the web server. When this request for a web page is received by software 92 on the web server that software is started (see box 98 in FIG. 6). The software 92 creates an ASP session 97 which is given a session identifier (see box 99 in FIG. 6). The session identifier uniquely identifies the particular user's session. Also, the software 92 processes a global.asa file. This contains a procedure which creates an instance of a COM object which is then referenced by a variable for the duration of the particular user's session. The global.asa file is processed before the web page that the user requested is processed.

The global.asa file is accessed when an internet information services (IIS) application starts and stops and also as individual users start and stop browser sessions that access the IIS application's Web pages. In the present case, the IIS application is that provided by the web server to allow the user to access multiple message servers. The Global.asa file contains a plurality of procedures examples of which are now described:

An Application_OnStart procedure executes the first time that any page in an ASP-based application is accessed.

An Application_OnEnd procedure executes only when the application is shut down.

A Session_OnStart procedure executes only once per user session.

A Session_OnEnd procedure executes only when a user's session times out or when a script explicitly calls the Session object's Abandon method. A session automatically ends if a user has not requested or refreshed a page in an application for a specified period of time (default is 20 minutes but may be changed).

Referring again to FIG. 6, the web server stores the session identifier in the user's web browser as a cookie 96. The ASP session continues and the user makes inputs to the web pages to request messages from a message server or to manipulate messages in other ways. These user inputs are communicated to a COM object (94 and 95 in FIG. 6) which in turn writes out a frame set (see box 101 in FIG. 6). A frameset is a group of frames which together form a screen or display for the user. The initial frameset provides a Login Page for example. Each frame can be independently updated in order to reduce the time taken to update individual pages.

Referring again to FIG. 6, after storing the session identifier cookie 96 in the user's browser, ASP reuses the same cookie to track the session, even if the user requests another ASP file, or requests an ASP file running in another application. Likewise, if the user deliberately abandons or lets the session timeout, and then proceeds to request another ASP file, ASP begins a new session using the same cookie. The only time a user receives a new session identifier is when the server administrator restarts the server, thus clearing the session identifier settings stored in random access memory, or the user restarts the web browser.

In a preferred embodiment the present invention is provided as part of a web-browser-based application for accessing voice, fax, and text messages on a CallPilot (trade mark) or other Messaging system. CallPilot is a commercially available messaging system from Nortel Networks. In the preferred embodiment, existing messages can be replied to or forwarded, and new messages can be composed and sent. Outbound messages (messages that the user originates) can be addressed to users in a CallPilot directory or any other user that can be addressed by CallPilot. Messages can be deleted, and users are notified of the arrival of new messages.

Voice messages, can be played by downloading from a CallPilot server using a CallPilot player or third party player. They can be played over a telephone (landline or mobile) of the user's choice or played over the user's PC/Mac soundcard.

In the preferred embodiment the user is able to access and retrieve mail from any other IMAP4rev1 compliant email server. Users may also select an alternate CallPilot system to log in to.

In the preferred embodiment, users are able to access a Personal Mailbox Administration (PMA) web client, via a link in the user interface, if an administrator has granted them PMA web access. The link to the user's PMA web client does not require the user to login to the PMA client if the user has already logged in to the web-based user interface used for accessing the message accounts, thus providing the user "direct access" to their PMA functionality. With the PMA client the user can administer mailbox settings such as mailbox password and IMAP account information.

In most cases the CallPilot Web Messaging requires no software installation on the client machine as the majority of client machines will come pre-installed with a web browser along with all the software required to view/read messages and edit/create new message content.

All messages can be accessed through a data network. This allows dialup users to access messages through the same single telephone line used for the modem connection using message download via the data network. Dial-up users wishing to play voice messages over a telephone using the CallPilot player require a second telephone line for this purpose.

User Interface

Figure 7:
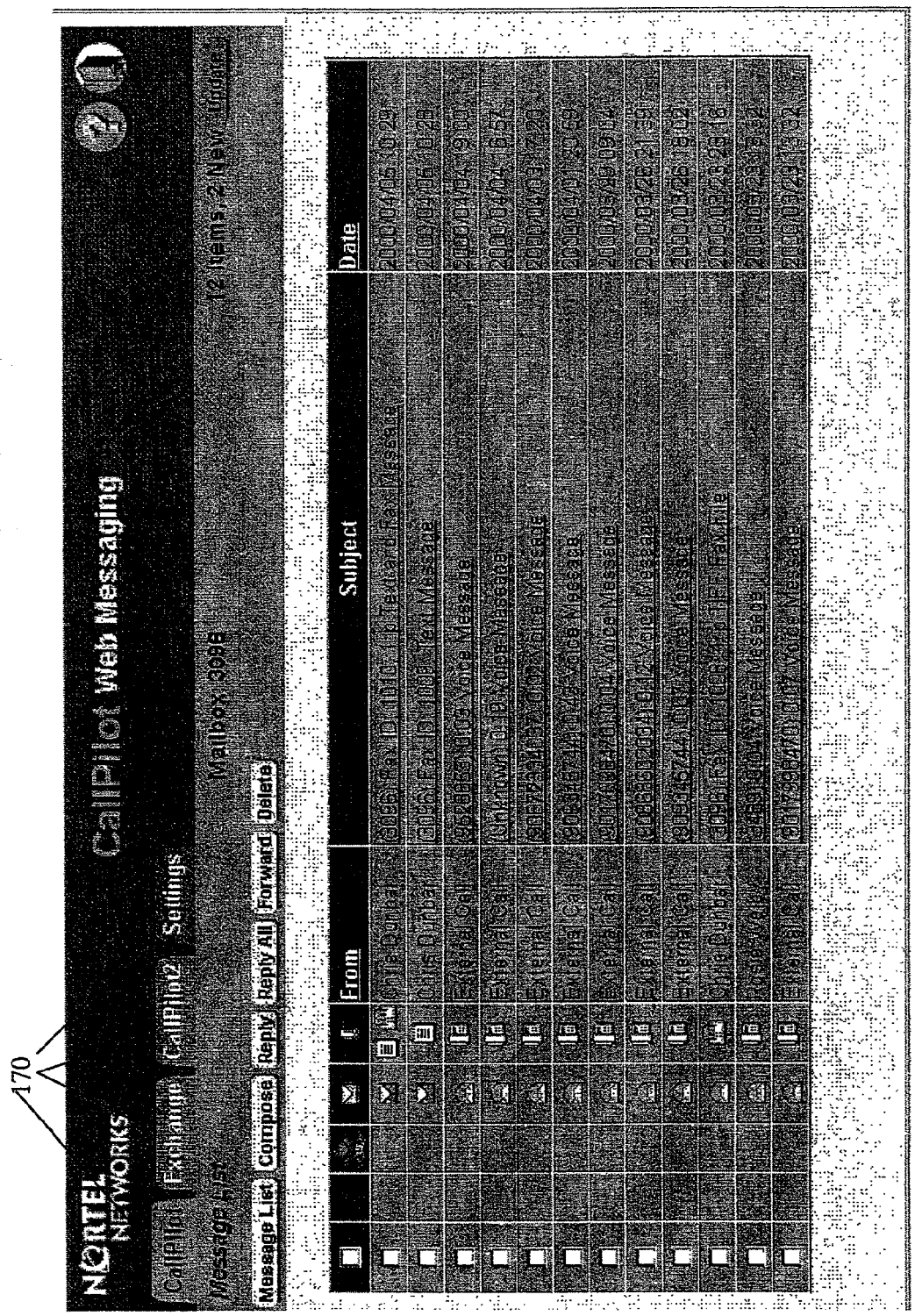
FIG. 7 is an example of a user interface display.

FIG. 7 shows an example of a user interface display presented to a user using the web based interface. The display contains a plurality of tabs 170 one for each message server that the user has pre-specified. By selecting a tab the user is automatically logged into the associated message server without an interactive dialog appearing. For example, in FIG. 7 the CallPilot tab has been selected and messages from the user's CallPilot account are displayed. If the user selects the Exchange tab, then the user is automatically logged onto an Exchange server and messages from a pre-specified account on that server are displayed.

In order to achieve this, the user pre-specifies the message servers that he or she wishes to access and gives details of his or her user names and passwords. This information is stored by the web server, or is accessible to the web server and used to automatically log the user into the appropriate message server. The information is stored in a secure manner and is accessed in a secure manner. For example, the user may specify a default message server, to which the user is always logged in first by the web server. The user name and password information may then be stored at this default message server.

In the example shown in FIG. 7 the user is able to view and work with messages from only one particular message server at a time. However, this is not essential. It is also possible for messages from each of the message servers to be combined into a single "in-box" for access by the user.

Tags are used to indicate where each message came from, and using these tags the code in the Messaging system determines which message server to interrogate.

In a preferred embodiment, a single in-box is created first containing messages from each of the message servers. The messages from that inbox are then separated into appropriate groups for display separately according to which message server they originated from.

Security

In order to ensure that communications with the default message server and other message servers is secure, a suitable security mechanism is used, such as the CRAM-MD5 challenge/response mechanism. As defined in IETF RFC 2195.

It is also possible to use the Kerberos Support security mechanism instead of GRAM-MD5. Kerberos is a network authentication protocol that is freely available from the Massachusetts Institute of Technology. Details of the Kerberos Support encryption alogorithm are provided on the Internet and are incorporated herein by reference.

Alternatively, an authentication by login method is used.

In order to ensure that access to the web server is secure encryption is used when the user logs in to the web server from his or her web browser. Any suitable encryption method may be used as is known in the art.

Figure 8:
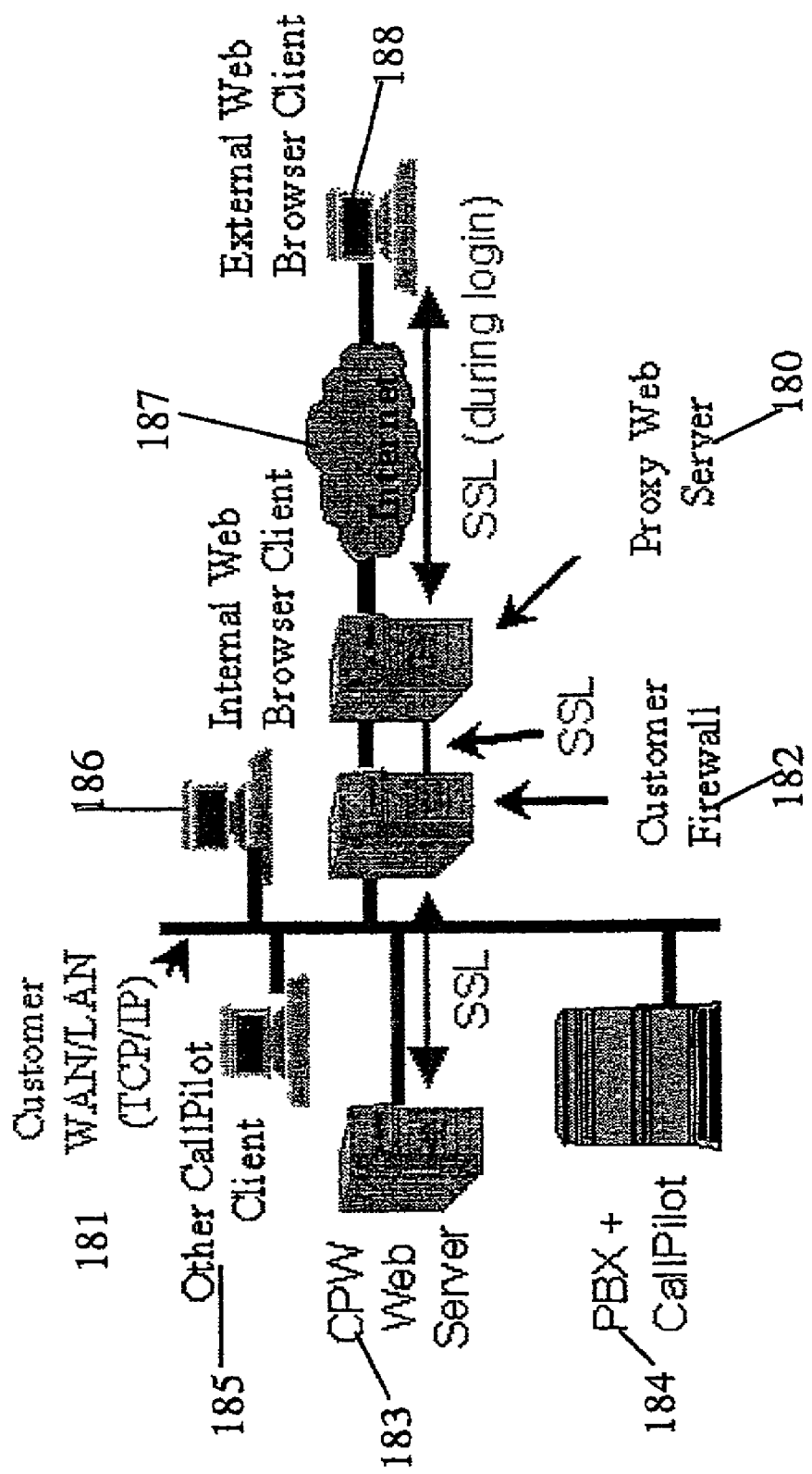
FIG. 8 shows use of the apparatus of FIG. 2 in a network with an internet firewall.

FIG. 8 shows use of the apparatus in a network with an internet firewall. The web server is connected to an enterprise's intranet such as a wide area network or local area network 181. The enterprise's message server 184, in this example, a CallPilot server and private branch exchange 184 are also connected to the enterprise's intranet 181. Internal web browser clients 186 and other clients suitable for accessing the CallPilot server 184 are also connected directly to the enterprise's intranet 181.

The enterprise's intranet 181 is connected to the public internet 187 via a firewall 182 as is known in the art. In addition, a proxy web server 180 is connected between the firewall 182 and the internet 187. An external web browser client 188 is shown connected to the internet 187. All traffic from the proxy web server 180 to the internal web server 182 is secured using secure sockets layer (SSL, IETF RFC 2487) as is known in the art.

Using the arrangement shown in FIG. 8, all traffic to and from the CallPilot server remains behind the firewall 182. Also, the firewall 182 is configured to allow hyper text transfer protocol (HTTP) connections between the internal web server 183 and the proxy web server 180.

In a preferred embodiment, details of messages retrieved from the user's message accounts are stored in a cookie on the user's PC or other terminal. Examples of specific details saved are sender-name, subject and date for each retrieved message. By doing this, on subsequent logons, the time it takes to logon is greatly reduced because specific details of the user's messages are retrieved from the cookie rather than from the message servers. This reduces the network bandwidth required and greatly increases the speed of building a message-list view for a mailbox or other message box. Identification of the appropriate data for a particular user is achieved using indexed cookies based on the user's logon identity.

Figure 9:
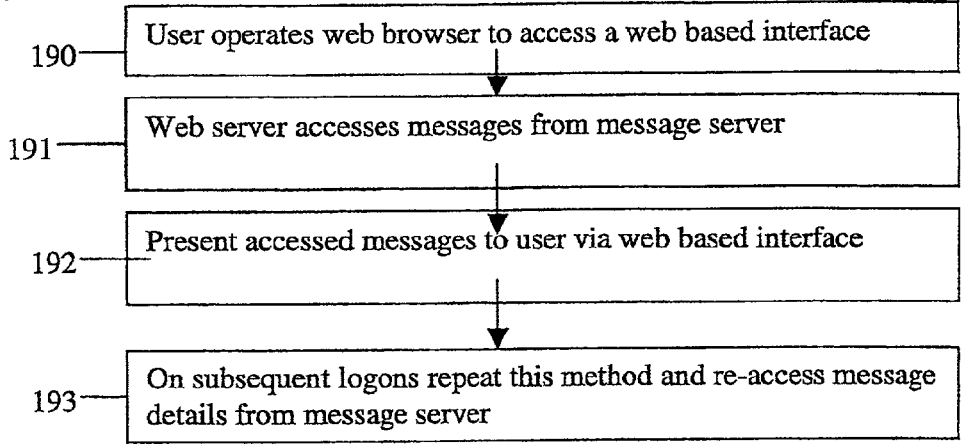
FIG. 9 is a flow diagram of a method of accessing messages from a message server according to the prior art.

FIG. 9 is a flow diagram of a method of accessing messages from a message server according to the prior art. A user operates a web browser on his or her PC to access a web based interface (see box 190) which provides access to a message server. Messages stored in a message account associated with the user are accessed and presented to the user via the web browser (see box 191 and box 192). Later, when the user wishes to access his or her message account again, he or she repeats the same method (see box 193) and all the messages in the user's message box (including previously accessed messages and new messages) are accessed again. However, this is time consuming and takes up valuable bandwidth, especially when the user has large numbers of messages.

Previously, in order to address this problem, others have provided a dedicated local server (i.e. separate from the message server and local to the users) used to store previously accessed messages. Then details of previously accessed messages are obtained from the dedicated local server which can be accessed more quickly. However, this method is problematic because significant amounts of administration are required. The local server often becomes full or may crash.

Figure 10:
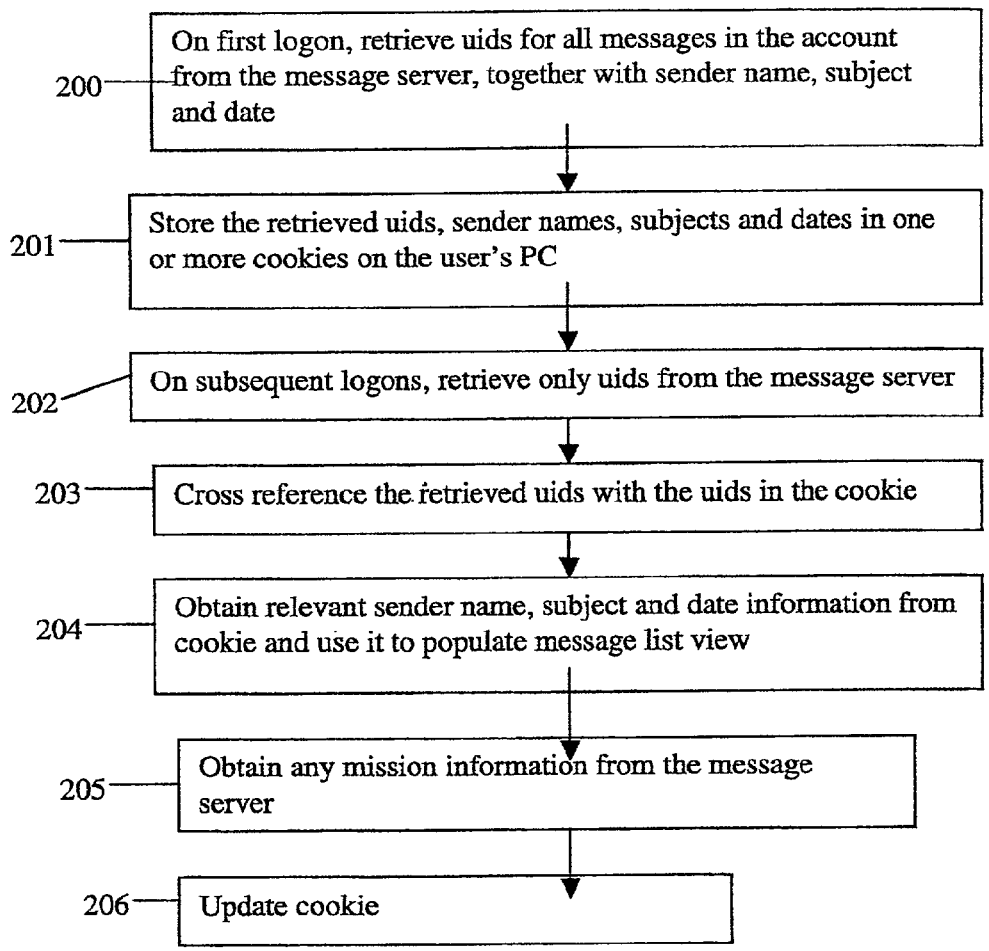
FIG. 10 is a flow diagram of a method of accessing messages from a message server in order to reduce logon times and network bandwidth requirements.

FIG. 10 is a flow diagram of a method of accessing messages from a message server which overcomes these problems. Each message on the message server has an associated unique identifier called a "uid". When a user logs onto their message account on a particular message server for the first time, then a list of the uids for all the messages in the message account are retrieved. For each message, the sender name, subject and date are also retrieved and stored in one or more cookies on the user's PC or other terminal, together with the associated uids (see boxes 200 and 201 of FIG. 10). For example, sender name, subject and date comprise the header of a particular message. It is not essential to store these particular details, other details such as just the sender name could be stored.

On subsequent logons, the current list of uids for all the messages in the message account are retrieved from the message server (see box 202 of FIG. 10). For example, this list may comprise uids for previously accessed messages and uids for new messages. The active server pages, or other web pages, access the cookie on the user's PC and obtain the sender name, subject and date for all previously accessed messages (see boxes 203 and 204). Only information for the new messages needs to be retrieved from the message server, using the method described above (see box 205). This reduces the network bandwidth required in order to display a message list view and greatly increases the speed of building a message list view for a particular message box. In addition, the message server's central processing unit (CPU) usage is reduced and greater stable scalability of the messaging system is achieved. If the user wishes to view the body of a particular message, the message body is retrieved from the message server.

When all message details have been retrieved from either the cookie or the message server, the cookie is flushed and the latest encrypted and compressed message-details for the message box are saved to the cookie. In this way, the cookie is always synchronised with the user's mailbox (see box 206 of FIG. 10).

Co-pending U.S. patent application Ser. No. 09/676,741 which is also assigned to Nortel Networks describes how HTTP can be used to access an IMAP messaging server. The detailed description from that application is repeated below with reference to FIGS. 11 to 15. The present invention extends the system described in U.S. Ser. No. 09/676,741 to enable multiple messaging servers to be accessed.

Figure 11:
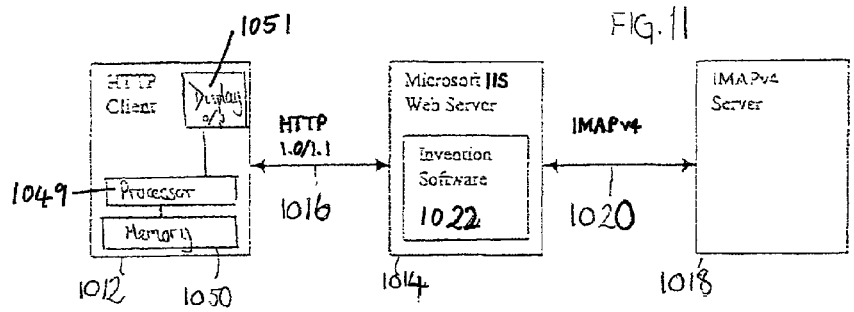
FIG. 11 is a schematic diagram of a client-server architecture arranged to support a preferred embodiment of the present invention.

The system now described provides access to an e-mail server from a web browser and, more specifically, allows any HTTP "client" (a web browser) to access any IMAP "server" (the e-mail system). In overview, the system now described is arranged to support proxy software on an intermediate proxy server, such as a Microsoft Internet Information Server (IIS), which proxy software effectively translates requests from the client, specified using the HTTP protocol, to commands for the server (issued using the IMAP protocol and vice versa). Turning briefly to FIG. 11, a high-level overview of a client-server architecture 1010 (that supports the concepts of the system) is shown.

Essentially, bi-directional communication between an HTTP client 1012 and a web-server 1014 (such as that supporting Microsoft IIS) is via HTTP 1.0/1.1. (or a later protocol release) 1016. The web server 1014 interconnects to an IMAP server 1018 (e.g. IMAPv4 or later releases) through an IMAP connection 1020. The web server 1014 includes software configured to support the various aspects of the system (labelled "invention software" 1022) in FIG. 11.

The HTTP client 1012 includes a control processor 1049 having associated memory 1050 that stores data and program code. The HTTP client 1012 also includes some form of man-machine interface 1051, including a display.

Figure 12:
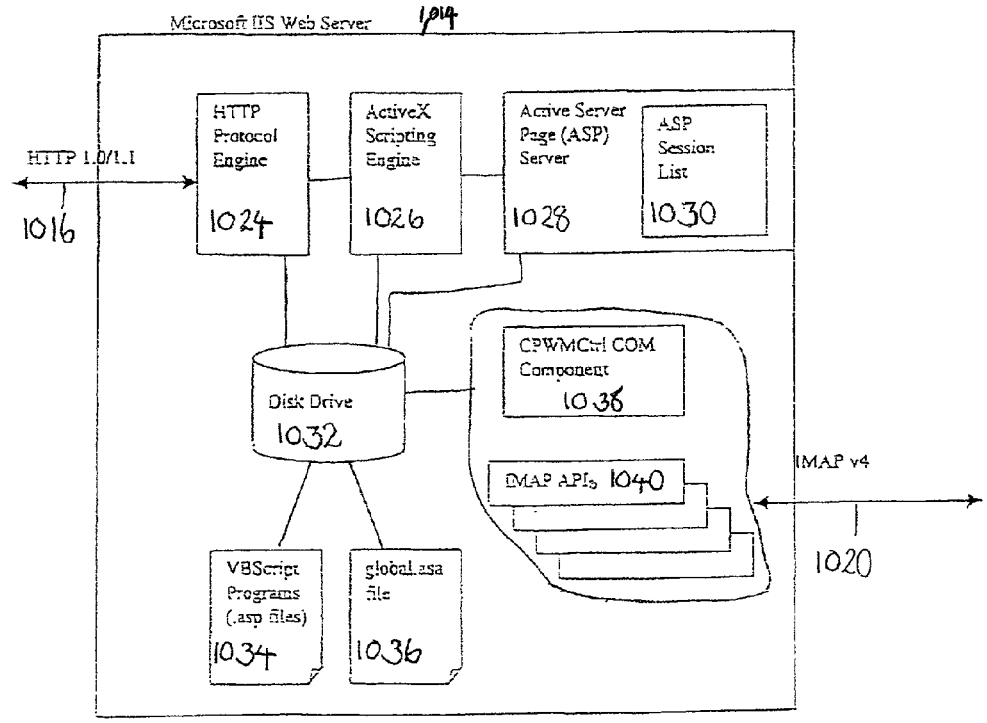
FIG. 12 shows the functionality of the proxy server of FIG. 11 in more detail.
Figure 13A:
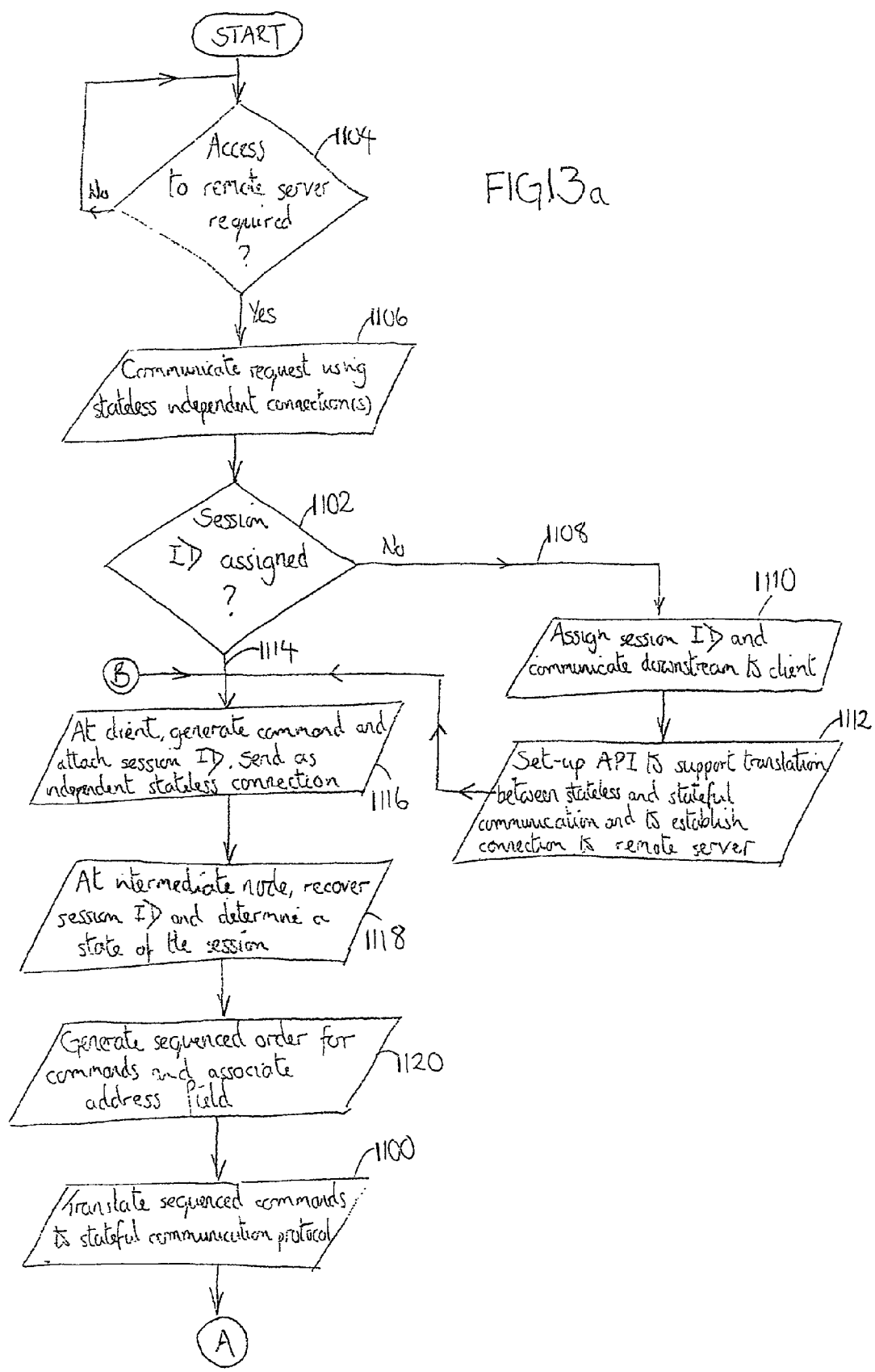
FIG. 13a is a flow diagram illustrating the first part of an underlying inventive mechanism for stateful-stateless communication protocol interconnection.
Figure 13B:
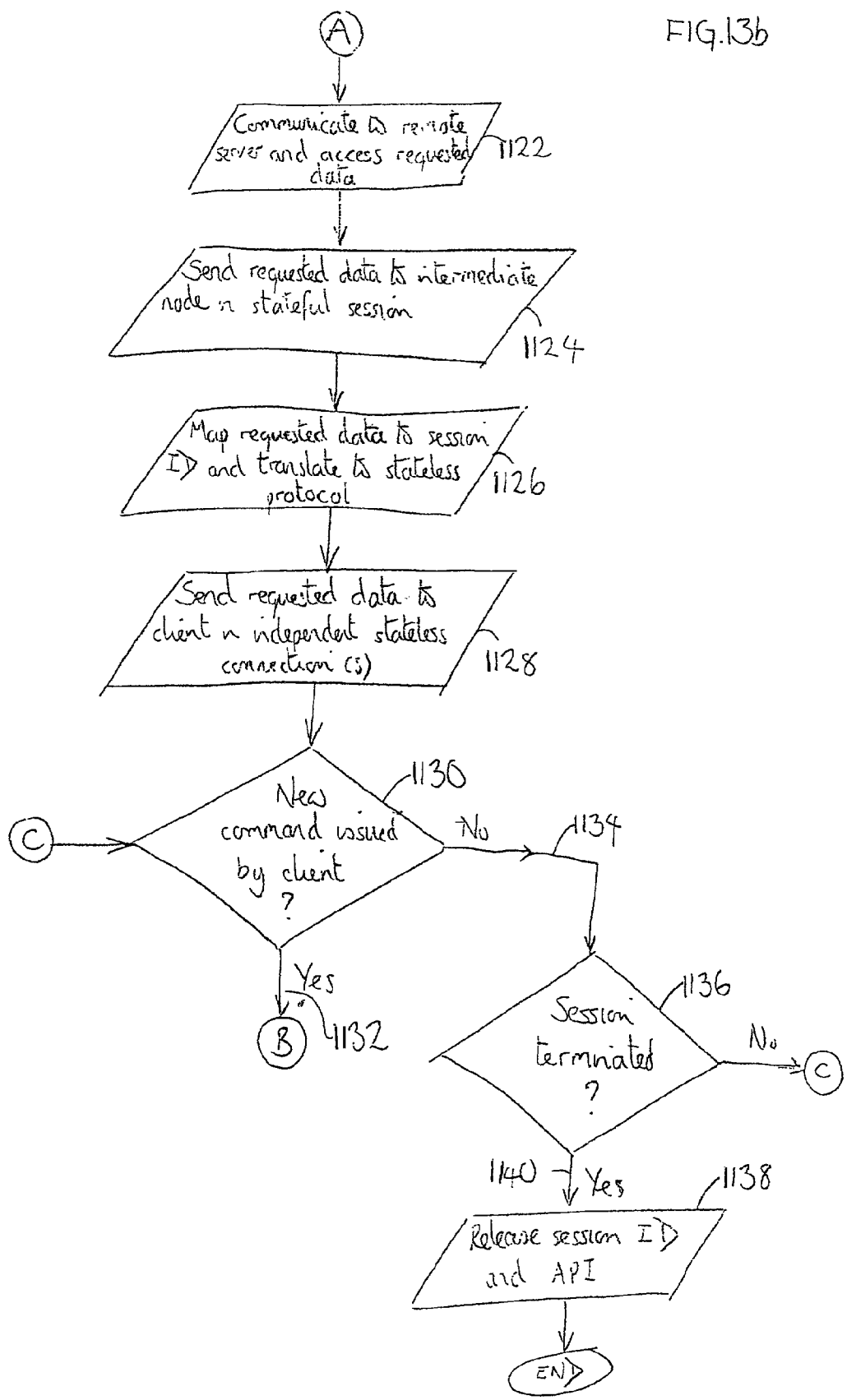
FIG. 13b is a flow diagram illustrating the second part of an underlying inventive mechanism for stateful-stateless communication protocol interconnection.

An understanding of the HTTP-to-IMAP protocol conversion (according to an embodiment) is best understood with reference to FIG. 12 that essentially shows an exploded view of the web server 1014 of FIG. 11. The entities within FIG. 12 are a combination of logic and memory storage areas or program applications, code or sub-routines.

In developing the embodiment, it has been appreciated that IMAP (like other stateful protocols) requires specific protocol interactions to support access, and that it is therefore necessary to configure an intermediate server to act as a stateless-stateful translator in order to access an IMAP operating system from a remote web-server supporting a stateless protocol. The mechanism by which the embodiment provides seamless connectivity between a stateless and stateful protocol is described in detail below.

Before discussing the signalling scheme and IMAP call set-up procedure of the preferred embodiment, an overview of the entities of the web server 1014 will be discussed. An HTTP protocol engine 1024 interprets incoming commands from the web browser. In the preferred embodiment, these incoming commands are in the form of HTTP. The HTTP protocol engine 1024 is essentially an interface command processor, as will be appreciated. Co-operating with the HTTP protocol engine 1024 is an ActiveX Scripting Engine 1026 arranged to acquire appropriate .asp files (and the like) associated with and responsive to the incoming commands. The .asp files can, for example, relate to "log-in" and "open message" commands sent upstream from the client 1012. According to the embodiment, the conventional functionality of the active-server page (ASP) server 1028 is enhanced to support new functionality that creates and distributes a session identity. The HTTP protocol engine 1024, ActiveX Scripting Engine 1026 and basic, unmodified functionality of the active-server page (ASP) server 1028 are conventionally present within a web server.

Associated with the ASP server 1028 is an ASP session list 1030, which is stored locally within a memory storage device 1032. The memory storage device 1032 also stores visual basic (VB) script programs 1034 (i.e. .asp files and the like) and global.asa files 1036. As will be understood, the VB script programs 1034 and global.asa files 1036 are files containing lists of commands utilised to interpret up-link requests for service.

Additionally, the memory storage 1032 device is used to store session management functionality and control objects (termed "CPWMCtrl.com components 1038") and IMAP application program interfaces (APIs) that provide the protocol translation and physical interfaces between at least one of the remote (e.g. an IMAP stateful entity) server 1018 and the web-server 1014.

By way of overview (and with reference to FIG. 12 and FIGS. 13a and 13b), the web-server 1014 acts as an intermediate node between a client 1012 (typically supporting a web browser application utilising a stateless communication protocol) and the server 1018 accessible across an interface supporting a stateful communication protocol. The web-server 1014 is configured to support translation 1100 between the stateless communication protocol and the stateful communication protocol. The web-server 1014 is arranged to provide 1102 a session identity (ID) to the client 1012 during the establishment 1104-1112 of a session, with the session ID arranged: i) to identify a relationship within stateless independent connections between the client 1012 and the web-server 1014; and ii) to associate each stateless independent connection to a stateful session between the web-server 1014 and the server 1018. In this context, the term "stateless independent connections" relates to commands or data packets that are sent upstream from the client 1012 using a stateless communication protocol.

With the session ID assigned 1114 to the client for the duration of a session, the session ID is attached 1116 to each uplink independent stateless connection in order that the web-server can determine 1118 a state of the session, i.e. that the web-server 1014 can interpret the received stateless independent connections/commands to resolve out 1120 an ordered sequence of commands from a particular client 1012. Contemporaneously with the web-server 1014 sending 1110 the session ID to the client 1012, the web-server 1014 establishes an object representing/defining a stateful session between the web-server 1014 and the server 1018. Hence, upon receipt of stateless independent connections from the client 1012, the web-server 1014 can map an accompanying session ID into a related session and can then construct a meaningful translation 1100 of commands between the stateless protocol and the stateful protocol based on the state of the session. A resultant stateful protocol is communicated 1122 upstream to the server 1018 via a suitable application program interface (API) assigned/configured 1112 for the duration of the session. The stateful protocol includes an address field that ensures that the correct downlink information from the server is communicated back to the web-browser 1014 that made the original uplink request.

Downlink information (from the server 1018) contained in the stateful protocol is routed 1124 through the assigned API for translation to the stateless communication protocol. The ASP server 1028 and associated ASP session list 1030 then co-operate/map 1126 the requested data to the client using 1128 downlink independent stateless connections/commands. It is worth noting that the session ID does not need to be attached to the downlink independent stateless connections since the downlink connection is client-address specific.

Should a new command be issued 1130-1132 by the client 1012, then the process returns to step 1116, otherwise 1134 a determination 1136 is made as to whether the session is terminated 1136, whereby 1140 the session ID and API are released 1138.

Figure 14:
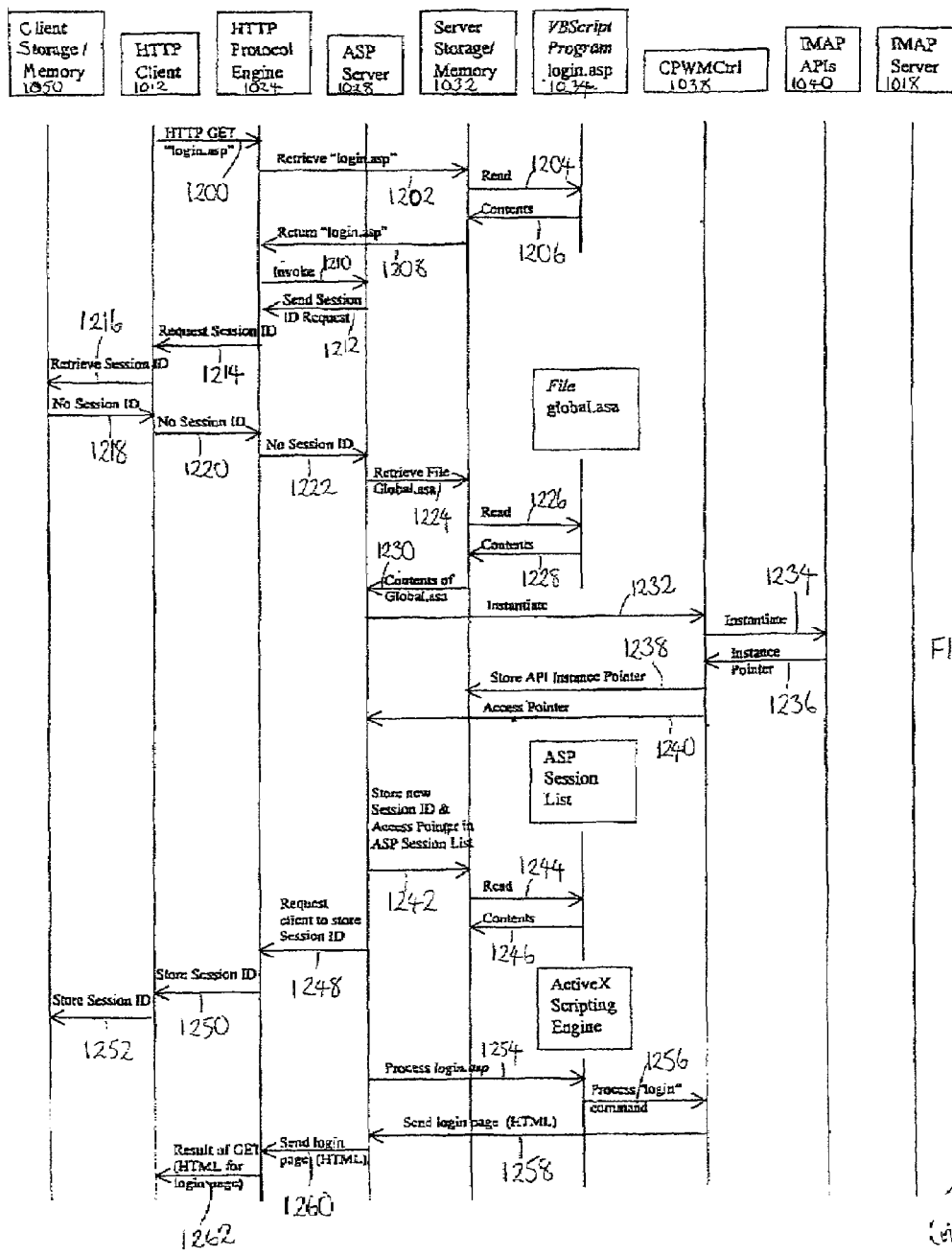
FIG. 14 is a component collaboration (event timing) diagram according to a preferred session initialisation process.
Figure 15:
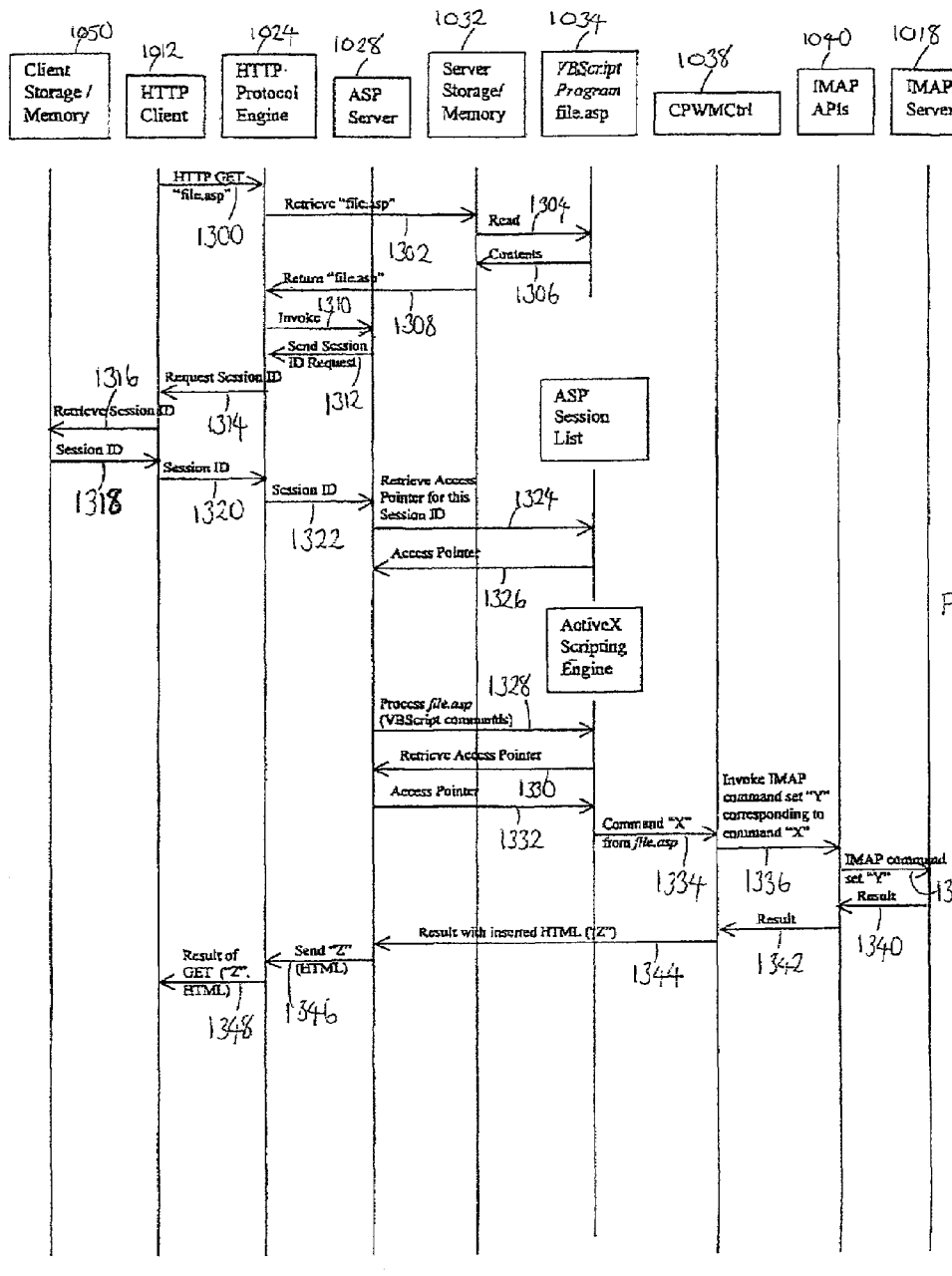
FIG. 15 is a component collaboration (event timing) diagram according to a preferred session resumption process.

From the perspective of a preferred implementation, set-up and operating procedures will now be described with particular reference to the component collaboration (event timing) diagrams of FIGS. 14 and 15. FIG. 14 is actually illustrative of session initialisation, whereas FIG. 15 is illustrative of session resumption.

In relation to access to the IMAP server 1018, set-up is generally initiated by the web browser (HTTP client) 1012 through the sending of a login request or "GET" command 1200 within a HTTP message. The login request 1200 from an HTTP client 1012 specifies a .asp MIME file suffix, as required by internet-based protocols, to identify an appropriate application (conventionally stored within a VB scripts-type structure 1202-1206) at the web-server 1014 to open the accompanying file. The login request therefore provides/requires access to an appropriate and specific .asp file and permits login of the client by returning an appropriate response 1208 to the HTTP protocol engine 1024. The HTTP protocol engine 1024 invokes 1210 the active server page (ASP) server 1028 for the ASP server to determine whether there is an existing, i.e. previously assigned, session ID. In the expectation of receiving a previously assigned session ID, the ASP server is arranged to send the session ID request 1212-1214 back to the web browser (of the HTTP client 1012). The client 1012 checks 1216 its local memory for any previously assigned session ID for the present session. At initialisation, the control processor 1049 of the HTTP client 1012 attempts to locate 1216 a session ID from the memory 1050, but instead finds 1218 that such a session ID does not exist (since no session has yet been started).

The session ID is preferably stored at the client 1012 in the form of a "Cookie", although other mechanisms readily appreciated by the skilled addressee can be employed with equal effect.

The HTTP client 1012 generates a corresponding HTTP "no session ID" response and communicates 1220-1222 this response to the ASP server 1028 via the HTTP engine 1024.

The ASP server 1028 therefore executes procedure to establish a new session, since the assignment of a session ID is session specific and hence transitory. Software code allowing the ASP server 1028 to generate and assign session IDs is stored within "global.asa" files 1036 and so the ASP server 1028 sets out to access 1224-1226 and retrieve 1228-1230 the necessary global.asa files (preferably stored within VB script programs). The ASP server 1028 is now able to execute code to instantiate 1232 (i.e. create and invoke an instance of) the ctrl.com object 1038 (CPWMCrtl COM Component) for control of stateless-stateful translation and interface operation. The ctrl.com object 1038 in turn instantiates 1234 an IMAP API 1040 for assignment to the client for the duration of the session. With the assignment of a particular API to a session ID, an instance pointer 1236 is established by the assigned API and communicated 1238 to the memory storage 1032 of the web-server 1014. An access pointer is also generated 1240 by the ctrl.com object for use by the ASP server 1028 in the set-up and tear-down of the stateless-stateful protocol translation/interworking session.

In this preferred embodiment, the ASP server 1028 is now able to create 1242 a specific session ID, which is stored in the ASP Session List 1030. The ASP server 1028 also stores an access pointer to the ctrl.com object in the session list 1030, the access pointer being indexed by the session ID 1244-1246. The ASP server 1028 now requests the HTTP engine 1014 to issue an HTTP command to the HTTP client 1012 requesting the client 1012 to store the session ID 1248-1252 for later use; storage of the session ID at the client could be in the form of a Cookie.

The ASP Server 1028 reads/processes (from VB Scripts Programs 1034) the corresponding .asp file originally sent upstream from the HTTP client 1012 by way of an information access/download request. The ASP server 1028 determines that the .asp file actually contains a further VB Script program that must first be processed by the ActiveX Scripting Engine 1026. The ASP server 1028 now invokes the ActiveX Scripting Engine 1026 for this "login" purpose and provides to the ActiveX Scripting Engine 1026 a reference to the .asp file 1254. The ActiveX Scripting Engine 1026 reads the .asp file and executes the corresponding VB Script program to support "login". In so doing, the ActiveX Scripting Engine 1026 encounters a reference (within the VB Script program) to an initialise function 1256 for the crtl.com object 1038, whereby the ActiveX Scripting Engine 1026 uses this reference to invoke 1256 initialisation of the ctrl.com object 1038. In turn, the ctrl.com object 1038 causes instantiation of an IMAP API 40 for the specific HTTP client 1012. The ActiveX Scripting Engine 1026 further operates to pass to the ctrl.com object 1038 a reference to the ASP Server 1028 thereby to define a connection path. The crtl.com object is now able to send 1258-1262 HTML code describing a login page back to the HTTP client 1012 by routing the HTML code (for the login page) via the ASP Server 1028 and the HTTP Protocol Engine 1024. System initialisation is therefore completed upon receipt of the code associated with the login page being received at the HTTP client 1012.

In summary of the preferred method of implementation, should the login request not represent a request for commencement of a session, the ASP server 1028 invokes operation of the global.asa files 1036 in order to create the ctrl.com object 1038. The global.asa files 1036 therefore indicate to the ASP server 1028 the tasks required to set-up a new session. Once instantiated, the ctrl.com object 1038 supports HTTP-IMAP protocol conversion through the control of an associated IMAP API 1040, with the ctrl.com object 1038 and associated IMAP API 1040 effectively providing an HTTP-IMAP interface. In practice, the IMAP API 1040 connects to and communicates with the IMAP server 1018, whereas the ctrl.com object 1038 links into web-server software. At this point, an end-to-end connection can be established, with the session ID stored (by the ASP server 1028) within the ASP session list 1030. The ASP session list typically also cross-references associated ctrl.com objects and IMAP API locations with specific, i.e. individual, session IDs.

With the assigned session ID communicated to and stored in the web-browser of the HTTP client 1012, the ASP server 1028 is now in a position to undertake house-keeping to simplify connection. Specifically, with the ASP session list 1030 identifying the connection path, simplified routing of uplink requests (and downlink data) can be actioned within the web-server.

The session ID is used by the HTTP client 1012 and web-server 1014 over a series of connections, and is invalidated at the end of each session.

At this point (the last entry in FIG. 14), the connection mechanism is complete and so a session can be continued (or effectively commenced) with the HTTP client 1012 (i.e. the web-browser) sending the assigned session ID to the ASP server 1028 via the HTTP protocol engine 1024. Events 1300 to 1316 of FIG. 15 correspond to events 1200 to 1216 of FIG. 14, although a specific request for a file (labelled HTTP GET "file.asp" in FIG. 15) replaces the "login" command; repetition of the corresponding interactions and procedural steps is therefore omitted for the sake of brevity. The assigned session ID is communicated 1318-1322 to the ASP server 1028. The ASP server 1028 is arranged to check the ASP session list 1030 for the session ID and, in view of the recorded existence of the session ID, the ASP server 1028 becomes aware that the session is, in fact, a continuation of an earlier session. Consequently, the ASP server 1028 does not need to look to the global.asa files 1036, but instead needs to identify the unique session-orientated interface (i.e. an assigned IMAP API 1040) for each web-browser.

In response to the receipt (via the HTTP protocol engine 1024) of the session ID from the HTTP client 1012, the ASP server 1028 looks 1324-1326 to the ASP session list 1030 for an assigned memory address (i.e. the access pointer) to the API for the correspondingly received session ID. The ASP server 1028 is now in a position to invoke operation of the ActiveX scripting engine 1026, with the ASP server 1028 now able to pass/process 1328 the original (or current) .asp file command request to the ActiveX scripting engine 1026. The ActiveX scripting engine 1026 is then tasked to obtain a VB script command to allow the ActiveX scripting engine 1026 to obtain direct access to the HTTP-IMAP interface provided by the crtl.com object 1038 and IMAP API 1040. Therefore, the VB Script programs 1034 provide instructions by which the ActiveX scripting engine 1026 can ask 1330-1332 the ASP server 1028 for the access pointer to the crtl.com object 1038. In session, the VB Scripts program 1034 provides access to the access pointer to allow the ActiveX scripting engine 1026 to access 1334 the crtl.com object 1038 in order for the ActiveX scripting engine 1026 to issue an appropriate session-orientated command, e.g. login, open message, delete. The appropriate message is then passed 1336 to the corresponding API 1040 (for the session) for reformatting into an IMAP (stateful) format before being communicated 1338 to the IMAP server 1018.

In slightly more detail, the ASP Server 1026 reads/processes 1328-1330 the .asp file and determines that it contains the VB Script program that must processed be by the ActiveX Scripting Engine 1026. The ASP server 1026 therefore invokes 1332 the ActiveX Scripting Engine 1024 for this purpose, providing ActiveX Scripting Engine 1024 with a reference to the .asp file. The ActiveX Scripting Engine 1024 reads the .asp file and executes the VB Script program. In so doing, the ActiveX Scripting Engine 1024 encounters within the VB Script program a reference to a given function "X" in the ctrl.com object 1038. The function "X" could be, for example, retrieval of an e-mail message.

The ActiveX Scripting Engine 1024 now retrieves a reference to the crtl.com object from the ASP Session List 1030 and uses this reference both to invoke the function "X" and have the function "X" executed. More especially, the crtl.com object 1038 contains an indication that there is a need to invoke 1338 a set of IMAP commands, "Y". The IMAP API (1019), instantiated for a particular client, is then used to issue 1340-1342 IMAP commands "Y". The ctrl-.com object 1038 now acts to modify the results from the command "Y" by inserting HTML code into this data, thereby creating a modified command "Z". The ctrl.com object associated with the particular client is now in a position to send 1344 (or otherwise communicate) the modified command "Z" to the ASP Server 1028 using the previously stored reference. The ASP Server 1028 then sends 1346 the modified command "Z" to the HTTP Protocol Engine 1024 which in turns sends 1348 "Z" to the HTTP client 1012. Upon receipt of the HTML code, the HTTP client 1012 is able to access the data in the modified command "Z".

In the reverse direction, IMAP datagrams for a specified HTTP-client are converted by the IMAP API 1040 into an HTTP format before being routed, via the crtl.com object to the HTTP protocol engine 1024. The specific path (shown in FIG. 14 as reference steps 1340–1348) is: (i) IMAP server to (ii) IMAP API to (iii) ctrl.com (re-formatted for HTML) to (iv) ASP server 1028 to (v) HTTP protocol engine 1024 to (vi) HTTP Client (browser) 1012.

By way of summary of the preferred session resumption mechanism, the web-browser (of the HTTP client 1012) displays a suitable log-in screen (emanating from the web-server 1014 through an HTML (HyperText Markup Language) or Java Script message. The HTTP client 1012 ultimately communicates the session ID upstream (since the ASP server 1028 assesses that it is charged, as before, with determining whether the session is new). The HTTP client 1012 then sends appropriate .asp files for interpretation by the ASP server 1028 and relay, in a re-formatted state, to the IMAP server 18. The HTTP client 1012 issues an HTTP "GET" command to the HTTP protocol engine 1024, requesting a specific .asp file (stored in VB Script programs 1034). As above, the HTTP protocol engine 1024 fetches the .asp file from the web-server's file storage area, namely memory storage device 1032. The HTTP protocol engine 1024 determines that this file is intended to be processed by the ASP server 1026 and therefore both invokes the ASP server 1026 for this purpose and provides the ASP server with a reference to the relevant asp file. Cross-referencing of the session ID to the ASP session list 1030 identifies the crtl.com object 1038 and hence the IMAP API 1040.

At the end of a session, the session ID is purged from the ASP session list 1030 and the memory 1050 of the HTTP client 1012. Release of the session ID is generally accomplished by a suitable HTTP sign-off message communicated upstream to the web-server 1014.

Thus a method is provided by which a proxy of the preferred embodiment allows a client that does not use a session-orientated (i.e. stateful) protocol to access an IMAP server. The preferred embodiment ensures that an appropriate session ID is established for transparent HTTP-IMAP connectivity between a web-browser and an IMAP server 1018, with the session ID preferably stored at the HTTP client 1012.

Whilst the specific embodiment described above allows clients to access only a subset (namely messaging) of the IMAP server functionality, the method also applies in a more general sense and can therefore be employed to access and obtain any data supported on (and accessible through) the IMAP communication protocol.

Alternative embodiments of the invention may be implemented as computer program code encoded on a computer program product for use with a computer system. It is expected that such a computer program product may be distributed as a removable medium with accompanying printed or electronic documentation (e.g. shrink-wrapped software), preloaded with a computer system or distributed from a server or electronic bulletin board over a network (e.g. the Internet or World Wide Web). A series of computer instructions can therefore either be fixed on a tangible medium or fixed in a computer data signal embodied in a carrier wave that is transmittable to a computer system using wireline or wireless transmission techniques. The removable (i.e. tangible) medium may be a computer readable media, such as a diskette, CD-ROM, DVD-ROM or RAM, fixed disk, magneto-optical disks, ROMs, flash memory or magnetic or optical cards. The series of computer instructions embodies all or part of the functionality previously described herein with respect to the system.

Software embodiments of the invention may be implemented in any conventional computer programming language. For example, preferred embodiments may be implemented in a procedural programming language (e.g. "C") or an object oriented programming language (e.g. "C++").

Although the preferred operating method is realised by general or specific-purpose processor or logic circuits programmed with suitable machine-executable instructions, hardware components may possibly be used to implement certain features of the present invention. Of course, the present invention may be performed by a combination of hardware and software.

It will, of course, be appreciated that the above description has been given by way of example only and that modifications in detail may be made within the scope of the present invention. For example, the underlying inventive concepts can be employed more widely than the realm of HTTP and IMAP interaction, since the present invention is equally applicable to and can be adapted to support ACAP-HTTP, LDAP-HTTP (lightweight directory access protocol-HTTP) and SMTP-HTTP (simple mail transfer protocol-HTTP). Equally, the stateless protocol of the preferred embodiment (i.e. HTTP) can be substituted for other equivalent stateless schemes readily appreciated by the skilled addressee. Additionally, the ordering of stateless and stateful protocols is not important in the context of the present invention, with either the stateful or stateless protocol therefore configurable between the client and intermediate proxy server.

One advantage is that a web browser employing a stateless protocol, such as HTTP, may be used to access a stateful-based protocol (e.g. IMAP) server without the need to install any other software. This is especially advantageous since most web browsers currently come pre-bundled with operating systems. In other words, computers that are shipped with web-browser applications inherently have a capability to interact with stateful protocols, such as IMAP, whereby system functionality is enhanced with only minimal operational re-configuration of the code. Essentially, with a sessionless (or stateless) front-end protocol between a client and a proxy server, a stateful back-end protocol can be tied into stateless commands received at the proxy server in an upstream direction through the use of the session identity.

Other advantages, such as the ability to communicate through a firewall without reconfiguration, result. More specifically, in the sense of an IMAP-type protocol, a firewall is typically configured to prevent the passage of such a stateful-based protocol. With deployment of the present system, IMAP service can be employed through a firewall system configured to allow web-access and IMAP access.

By using a session ID (such as stored as a "Cookie") for each user, the proxy enables a non-IMAP client, e.g. one using HTTP, to access to an IMAP server. Thus, seamless access is provided between, for example, an HTTP client and an IMAP server. Once a Cookie has been created for a user, the Cookie may be used each time the user accesses the IMAP server until the session is changed or invalidated.

One application is to enable a web browser to provide an HTTP format URL for an email server since users are already accustomed to using URLs to reference objects. In prior art (RFC 2192) browser software without benefit of the invention, the browser needs to use the IMAP protocol to communicate with the IMAP server and thus the browser becomes a true IMAP client.

Any range or device value given herein may be extended or altered without losing the effect sought, as will be apparent to the skilled person for an understanding of the teachings herein.

A range of applications are within the scope of the invention. These include situations in which it is required to provide access to a plurality of message accounts from a single web-based interface. For example, a plurality of different types of email account, voice mail account, fax accounts or video message accounts.

What is claimed is:

1. A method of providing access to message content being in an original form from a plurality of message accounts via a single web-based interface, each message account having an associated messaging server and being arranged to be accessed from that associated messaging server using application software, said application software being different for each message account and associated messaging server, the messaging servers being connected to a communications network, said method comprising the steps of:
   (i) at a web server connected to the communications network, receiving user inputs from a web browser via the single web interface which indicate the user's desire to access messages from one or more of the message accounts;
   (ii) using the web server to access information from the messaging servers associated with the message accounts on the basis of the user inputs and using information about the messaging servers; and
   (iii) providing the accessed information for display on a user terminal via the single web interface such that the application software is not required on the user terminal;
   (iv) displaying in response to user input the content of the message on the web browser in its original form.

2. A method as claimed in claim 1 wherein the web server has access to user names and passwords for each of the message accounts.

3. A method as claimed in claim 1 wherein said web server comprises software for communicating with all the messaging servers.

4. A method as claimed in claim 1 wherein said messaging servers are arranged to communicate with the web server using internet message access protocol (IMAP).

5. A method as claimed in claim 1 wherein said step (ii) of using the web server to access information comprises issuing internet message access protocol (IMAP) messages from the web server to the message servers.

6. A method as claimed in claim 1 wherein said web server comprises web pages arranged to provide said single web interface.

7. A method as claimed in claim 6 wherein said web pages comprise active server pages (ASP) pages.

8. A method as claimed in claim 1 wherein said message accounts are selected from email accounts, voice mail accounts and combined email and voice mail accounts.

9. A method as claimed in claim 1 which further comprises providing at least part of said accessed information to the user terminal for storage in one or more cookies on the user terminal.

10. A method as claimed in claim 9 which further comprises the step of: on receipt of a subsequent user input from the web browser via the single web interface, which indicates the user's desire to access messages from one or more of the message accounts, checking the cookies on the user terminal for the presence of information about the desired messages.

11. A method as claimed in claim 9 wherein the information provided for storage in the cookies comprises an identifier for each message.

12. A method as claimed in claim 9 wherein the information provided for storage in the cookies comprises a subject, sender name and date for each message.

13. A method of accessing the content in original form of emails from a plurality of email accounts via a single web-based interface, each email account having an associated messaging server and being arranged to be accessed from that associated messaging server using application software, said application software being different for each message account and associated messaging server, the messaging servers being connected to a communications network, said method comprising the steps of:
   (i) using a web browser to access the single web interface that is provided by a web server connected to the communications network;
   (ii) making a user input via the web interface, said user input indicating the user's desire to access messages from one or more of the message accounts;
   (iii) receiving information about the messages at a user terminal vie the single web interface, without the need for the application software to be provided on that user terminal;
   (iv) in response to user input displaying the original form of an email.

14. A method as claimed in claim 13 which further comprises storing at least part of said received information about the accessed messages in one or more cookies on the user terminal.

15. A method as claimed in claim 14 which further comprises the step of: making a subsequent user input from the web browser via the single web interface, which indicates the user's desire to access messages from one or more of the message accounts, and checking the cookies on the user terminal for the presence of information about the desired messages.

16. A method as claimed in claim 14 wherein the information stored in the cookies comprises an identifier for each message.

17. A method as claimed in claim 14 wherein the information stored in the cookies comprises a subject, sender name and date for each message.

18. A web server arranged to provide access to a plurality of message accounts from a single web-based interface, each message account having an associated messaging server and being arranged to be accessed from that associated messaging server using application software, said application software being different for each message account and associated messaging server, the messaging servers and web-server being connected to a communications network, said web-server comprising:
  (i) one or more web pages arranged to receive user inputs from a web browser which indicate the user's desire to access messages from one or more of the message accounts; and
  (ii) a processor arranged to access information from the messaging servers associated with the message accounts on the basis of the user inputs and using information about the messaging servers; and wherein the web pages are arranged to display the accessed information on a user terminal via the single web interlace such that the application software is not required on the user terminal.

19. A web server as claimed in claim 18 wherein said web pages comprise active server pages (ASPs).

20. A web site arranged to provide a single web-based interface via which original form message content from a plurality of message accounts are accessible, each message account having an associated messaging server and being arranged to be accessed from that associated messaging server using application software, said application software being different for each message account and associated messaging server, the messaging servers and web-server being connected to a communications network, said website comprising:
  (i) a plurality of web pages arranged to receive user inputs from a web browser which indicate the user's desire to access messages from one or more of the message accounts; and
  (ii) a computer program arranged to access information from the messaging servers associated with the message accounts on the basis of the user inputs and using information about the messaging servers; wherein the web pages are arranged to display the accessed information on a user terminal via the single web interface such that the application software is not required an the user terminal; and
  (iii) in response to user input displaying the message content on the web browser in original form.

21. A web site as claimed in claim 20 wherein said web pages comprise active server pages.

22. A communications network comprising a web server as claimed in claim 18.

23. A computer program product embodied on a computer readable medium arranged to control a web server such that access is provided to original form message content from a plurality at message accounts via a single web-based interface, each message account having an associated messaging server and being arranged to be accessed from that associated messaging server using application software, said application software being different for each message account and associated messaging server, the messaging servers and web-server being connected to a communications network, said computer program product being arranged to control the web-server such that:
  (i) one or more web pages are provided, arranged to receive user inputs from a web browser which indicate the user's desire to access messages from one or more of the message accounts;
  (ii) information is accessed from the messaging servers associated with the message accounts on the basis of the user inputs and using information about the messaging servers; and
  (iii) the web pages are arranged to display the accessed information on a user terminal via the single web interface such that the application software is not required on the user terminal;
  (iv) in response to user input the message content is displayed on the web browser in its original form.

* * * * *